(12) United States Patent
Mullins et al.

(10) Patent No.: US 12,345,253 B2
(45) Date of Patent: *Jul. 1, 2025

(54) PACKING ASSEMBLY WITH THREADED SLEEVE FOR INTERACTION WITH AN INSTALLATION TOOL

(71) Applicant: Vulcan Industrial Holdings, LLC, Houston, TX (US)

(72) Inventors: Chance Ray Mullins, Spring, TX (US); Jason David Smith, Porter, TX (US); Steven Zachary Newberg, Houston, TX (US); Kyle Matthew Ellisor, Katy, TX (US); Aric Martin Gillispie, Houston, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 249 days.

This patent is subject to a terminal disclaimer.

(21) Appl. No.: 17/890,818

(22) Filed: Aug. 18, 2022

(65) Prior Publication Data
US 2022/0403839 A1  Dec. 22, 2022

Related U.S. Application Data

(60) Division of application No. 17/308,163, filed on May 5, 2021, now Pat. No. 11,421,679, which is a
(Continued)

(51) Int. Cl.
*F16J 15/18* (2006.01)
*F04B 37/12* (2006.01)
(Continued)

(52) U.S. Cl.
CPC ............ *F04B 53/164* (2013.01); *F04B 37/12* (2013.01); *F04B 53/22* (2013.01); *F16J 15/028* (2013.01);
(Continued)

(58) Field of Classification Search
CPC ........ F16J 15/14; F16J 15/002; F16J 15/3268; F16J 15/166; F16J 15/18; F16J 15/028; F04B 53/164; F04B 37/12; F04B 53/22
See application file for complete search history.

(56) References Cited

U.S. PATENT DOCUMENTS

| 1,316,539 A | 9/1919 | Ford |
| 1,364,848 A | 1/1921 | Walsh |

(Continued)

FOREIGN PATENT DOCUMENTS

| CN | 2556355 Y | 6/2003 |
| CN | 201149099 | 11/2008 |

(Continued)

OTHER PUBLICATIONS

Karolczuk et al., "Application of the Gaussian Process for Fatigue Life Prediction Under Multiaxial Loading", Mechanical Systems and Signal Processing 167 (2022), Nov. 14, 2021.

(Continued)

*Primary Examiner* — Vishal A Patel
(74) *Attorney, Agent, or Firm* — Womble Bond Dickinson (US) LLP

(57) ABSTRACT

A packing assembly includes a packing sleeve having a first sleeve portion and a second sleeve portion, wherein a first sleeve portion outer diameter is larger than a second sleeve portion outer diameter and a first sleeve portion inner diameter is larger than a second sleeve portion inner diameter. The packing assembly also includes a groove formed in the second sleeve portion outer diameter. The packing assembly further includes a shoulder formed at a transition between the first sleeve portion and the second sleeve portion. The packing assembly includes a shelf formed at the transition between the first sleeve portion and the second sleeve portion. The packing assembly also includes a plurality of packing components arranged within the first sleeve
(Continued)

portion inner diameter, at least a portion of the plurality of packing components engaging the shelf. The packing assembly further includes a seal positioned within the groove.

12 Claims, 23 Drawing Sheets

Related U.S. Application Data continuation-in-part of application No. 16/916,657, filed on Jun. 30, 2020, now abandoned.

(51) Int. Cl.
| | |
|---|---|
| *F04B 53/16* | (2006.01) |
| *F04B 53/22* | (2006.01) |
| *F16J 15/02* | (2006.01) |
| *F16J 15/16* | (2006.01) |
| *F04B 15/04* | (2006.01) |
| *F04B 47/00* | (2006.01) |
| *F04B 53/02* | (2006.01) |

(52) U.S. Cl.
CPC .............. *F16J 15/166* (2013.01); *F16J 15/18* (2013.01); *F04B 15/04* (2013.01); *F04B 47/00* (2013.01); *F04B 53/02* (2013.01)

(56) References Cited

U.S. PATENT DOCUMENTS

| | | | |
|---|---|---|---|
| 1,576,269 A | 3/1926 | Durant | |
| 1,595,459 A | 8/1926 | Durant | |
| 1,671,139 A | 5/1928 | Wilson | |
| 1,836,068 A | 12/1931 | Goldsberry | |
| 1,873,318 A | 8/1932 | Eason | |
| 1,914,737 A | 6/1933 | Elms | |
| 1,948,628 A | 2/1934 | Penick | |
| 1,963,684 A | 6/1934 | Shimer | |
| 1,963,685 A | 6/1934 | Shimer | |
| 2,011,547 A | 8/1935 | Campbell | |
| 2,069,443 A | 2/1937 | Hill | |
| 2,103,504 A | 12/1937 | White | |
| 2,143,399 A | 1/1939 | Abercrombie | |
| 2,146,709 A * | 2/1939 | Bird ...................... | F04B 53/164 |
| | | | 92/128 |
| 2,151,442 A | 3/1939 | Hardy | |
| 2,163,472 A | 6/1939 | Shimer | |
| 2,252,488 A | 8/1941 | Bierend | |
| 2,304,991 A | 12/1942 | Foster | |
| 2,506,128 A | 5/1950 | Ashton | |
| 2,539,996 A * | 1/1951 | Gleitz ................... | F16J 15/184 |
| | | | 411/81 |
| 2,547,831 A | 4/1951 | Mueller | |
| 2,713,522 A | 7/1955 | Lorenz | |
| 2,719,737 A | 10/1955 | Fletcher | |
| 2,745,631 A | 5/1956 | Shellman | |
| 2,756,960 A | 7/1956 | Church | |
| 2,898,082 A | 8/1959 | Von Almen | |
| 2,969,951 A | 1/1961 | Walton | |
| 2,977,874 A | 4/1961 | Ritzerfeld et al. | |
| 2,982,515 A | 5/1961 | Clinton | |
| 2,983,281 A | 5/1961 | Bynum | |
| 3,049,082 A | 8/1962 | Barry | |
| 3,053,500 A * | 9/1962 | Atkinson ................ | F16K 1/38 |
| | | | 251/332 |
| 3,063,467 A | 11/1962 | Roberts, Jr. | |
| 3,120,960 A | 2/1964 | Pippert et al. | |
| 3,166,332 A | 1/1965 | Olson | |
| 3,224,817 A | 12/1965 | Carter | |
| 3,276,390 A | 10/1966 | Bloudoff | |
| 3,277,837 A | 10/1966 | Pangburn | |
| 3,288,475 A | 11/1966 | Benoit | |
| 3,459,363 A | 8/1969 | Miller | |
| 3,474,808 A | 10/1969 | Elliott | |
| 3,483,885 A | 12/1969 | Leathers | |
| 3,489,098 A * | 1/1970 | Roth ...................... | F16J 15/18 |
| | | | 92/128 |
| 3,489,170 A | 1/1970 | Leman | |
| 3,512,787 A | 5/1970 | Kennedy | |
| 3,590,387 A | 6/1971 | Landis | |
| 3,640,501 A | 2/1972 | Walton | |
| 3,652,098 A | 3/1972 | Kawazu et al. | |
| 3,698,726 A | 10/1972 | Schettler | |
| 3,738,665 A | 6/1973 | Bilco | |
| 3,785,659 A | 1/1974 | Maurer et al. | |
| 3,809,508 A | 5/1974 | Uchiyama | |
| 3,847,511 A | 11/1974 | Cole | |
| 3,907,307 A * | 9/1975 | Maurer .................. | F16J 15/166 |
| | | | 277/513 |
| 3,931,755 A | 1/1976 | Hatridge | |
| 4,044,834 A | 8/1977 | Perkins | |
| 4,076,212 A | 2/1978 | Leman | |
| 4,184,814 A | 1/1980 | Parker | |
| 4,219,204 A | 8/1980 | Pippert | |
| 4,277,229 A | 7/1981 | Pacht | |
| 4,306,728 A | 12/1981 | Huperz | |
| 4,331,741 A | 5/1982 | Wilson | |
| 4,395,050 A | 7/1983 | Wirz | |
| 4,398,731 A | 8/1983 | Gorman | |
| 4,440,404 A | 4/1984 | Roach | |
| 4,500,267 A | 2/1985 | Birdwell | |
| 4,508,133 A | 4/1985 | Hamid | |
| 4,518,359 A | 5/1985 | Yao-Psong | |
| 4,527,806 A | 7/1985 | Ungchusri | |
| 4,565,297 A | 1/1986 | Korner | |
| 4,580,791 A | 4/1986 | DiRusso | |
| 4,662,392 A | 5/1987 | Vadasz | |
| 4,754,950 A | 7/1988 | Tada | |
| 4,763,876 A | 8/1988 | Oda | |
| 4,768,933 A | 9/1988 | Stachowiak | |
| 4,770,206 A | 9/1988 | Sjoberg | |
| 4,807,890 A | 2/1989 | Gorman | |
| 4,811,758 A | 3/1989 | Piper | |
| 4,822,058 A | 4/1989 | Butler et al. | |
| 4,861,241 A | 8/1989 | Gamboa | |
| 4,872,395 A | 10/1989 | Bennitt et al. | |
| 4,878,815 A | 11/1989 | Stachowiak | |
| 4,919,719 A | 4/1990 | Abe | |
| 4,951,707 A | 8/1990 | Johnson | |
| 5,020,490 A | 6/1991 | Seko | |
| 5,052,435 A | 10/1991 | Crudup | |
| 5,061,159 A | 10/1991 | Pryor | |
| 5,062,450 A | 11/1991 | Bailey | |
| 5,073,096 A | 12/1991 | King et al. | |
| 5,080,713 A | 1/1992 | Ishibashi | |
| 5,088,521 A | 2/1992 | Johnson | |
| 5,127,807 A | 7/1992 | Eslinger | |
| 5,131,666 A | 7/1992 | Hutchens | |
| 5,135,238 A | 8/1992 | Wells | |
| 5,149,107 A | 9/1992 | Maringer | |
| 5,201,491 A | 4/1993 | Domangue | |
| 5,209,495 A | 5/1993 | Palmour | |
| 5,249,600 A | 10/1993 | Blume | |
| 5,267,736 A | 12/1993 | Pietsch | |
| 5,273,570 A | 12/1993 | Sato | |
| 5,299,812 A | 4/1994 | Brestel | |
| 5,314,659 A | 5/1994 | Hidaka | |
| 5,362,215 A | 11/1994 | King | |
| 5,382,057 A | 1/1995 | Richter | |
| 5,478,048 A | 12/1995 | Salesky | |
| 5,493,951 A | 2/1996 | Harrison | |
| 5,533,245 A | 7/1996 | Stanton | |
| 5,540,570 A | 7/1996 | Schuller | |
| 5,572,920 A | 11/1996 | Kennedy | |
| 5,593,166 A | 1/1997 | Lovell et al. | |
| 5,626,345 A | 5/1997 | Wallace | |
| 5,636,688 A | 6/1997 | Bassinger | |
| 5,674,449 A | 10/1997 | Liang | |
| 5,806,858 A | 9/1998 | Harrelson, III | |
| 5,834,664 A | 11/1998 | Aonuma | |
| 5,859,376 A | 1/1999 | Ishibashi | |
| 5,895,517 A | 4/1999 | Kawamura | |
| 5,924,853 A | 7/1999 | Pacht | |

(56) References Cited

U.S. PATENT DOCUMENTS

| | | |
|---|---|---|
| 5,949,003 A | 9/1999 | Aoki |
| 6,139,599 A | 10/2000 | Takahashi |
| 6,200,688 B1 | 3/2001 | Liang |
| 6,209,445 B1 | 4/2001 | Roberts, Jr. |
| 6,328,312 B1 | 12/2001 | Schmitz |
| 6,340,377 B1 | 1/2002 | Kawata |
| 6,382,940 B1 | 5/2002 | Blume |
| 6,386,548 B1 | 5/2002 | Grimanis et al. |
| 6,436,338 B1 | 8/2002 | Qiao |
| 6,446,939 B1 | 9/2002 | Hoppe |
| 6,460,620 B1 | 10/2002 | LaFleur |
| 6,464,749 B1 | 10/2002 | Kawase |
| 6,482,275 B1 | 11/2002 | Qiao |
| 6,485,678 B1 | 11/2002 | Liang |
| 6,544,012 B1 | 4/2003 | Blume |
| 6,571,684 B1 | 6/2003 | Nov et al. |
| 6,623,259 B1 | 9/2003 | Blume |
| 6,634,236 B2 | 10/2003 | Mars |
| 6,641,112 B2 | 11/2003 | Antoff |
| 6,695,007 B2 | 2/2004 | Vicars |
| 6,702,905 B1 | 3/2004 | Qiao |
| 6,880,802 B2 | 4/2005 | Hara |
| 6,910,871 B1 | 6/2005 | Blume |
| 6,916,444 B1 | 7/2005 | Liang |
| 6,951,165 B2 | 10/2005 | Kuhn |
| 6,951,579 B2 | 10/2005 | Koyama |
| 6,955,181 B1 | 10/2005 | Blume |
| 6,959,916 B2 | 11/2005 | Chigasaki |
| 7,000,632 B2 | 2/2006 | McIntire |
| 7,036,824 B2 | 5/2006 | Kunz |
| 7,144,440 B2 | 12/2006 | Ando |
| 7,168,440 B1 | 1/2007 | Blume |
| 7,186,097 B1 | 3/2007 | Blume |
| 7,222,837 B1 | 5/2007 | Blume |
| 7,290,560 B2 | 11/2007 | Orr |
| 7,296,591 B2 | 11/2007 | Moe |
| 7,335,002 B2 | 2/2008 | Vicars |
| 7,341,435 B2 | 3/2008 | Vicars |
| 7,398,955 B2 | 7/2008 | Weingarten |
| 7,506,574 B2 | 3/2009 | Jensen |
| 7,513,483 B1 | 4/2009 | Blume |
| 7,513,759 B1 | 4/2009 | Blume |
| 7,562,675 B2 | 7/2009 | Nomichi et al. |
| 7,611,590 B2 | 11/2009 | Liang |
| 7,681,589 B2 | 3/2010 | Schwegman |
| 7,682,471 B2 | 3/2010 | Levin |
| 7,726,026 B1 | 6/2010 | Blume |
| 7,748,310 B2 | 7/2010 | Kennedy |
| 7,754,142 B2 | 7/2010 | Liang |
| 7,754,143 B2 | 7/2010 | Qiao |
| 7,757,396 B2 | 7/2010 | Sawada |
| 7,789,133 B2 | 9/2010 | McGuire |
| 7,789,161 B2 * | 9/2010 | Riley ............... E21B 21/02 277/327 |
| 7,793,913 B2 | 9/2010 | Hara |
| 7,828,053 B2 | 11/2010 | McGuire |
| 7,845,413 B2 | 12/2010 | Shampine |
| 7,861,738 B2 | 1/2011 | Erbes |
| 7,866,346 B1 | 1/2011 | Walters |
| 7,891,374 B2 | 2/2011 | Vicars |
| 7,931,078 B2 | 4/2011 | Toporowski et al. |
| 7,954,510 B2 | 6/2011 | Schwegman |
| 7,992,635 B2 | 8/2011 | Cherewyk |
| 8,020,638 B2 | 9/2011 | Chellappa et al. |
| 8,069,923 B2 | 12/2011 | Blanco |
| 8,075,000 B2 | 12/2011 | James et al. |
| 8,075,661 B2 | 12/2011 | Chen |
| 8,083,506 B2 | 12/2011 | Maki |
| 8,100,407 B2 | 1/2012 | Stanton |
| 8,141,849 B1 | 3/2012 | Blume |
| 8,147,227 B1 | 4/2012 | Blume |
| 8,181,970 B2 | 5/2012 | Smith |
| 8,201,832 B2 | 6/2012 | Kocurek |
| 8,261,771 B2 | 9/2012 | Witkowski |
| 8,287,256 B2 | 10/2012 | Shafer |
| 8,291,927 B2 | 10/2012 | Johnson |
| 8,292,301 B1 | 10/2012 | Gilstad et al. |
| 8,312,805 B1 | 11/2012 | Blume |
| 8,317,498 B2 | 11/2012 | Gambier |
| 8,328,202 B2 | 12/2012 | Foster et al. |
| 8,375,980 B2 | 2/2013 | Higashiyama |
| 8,376,723 B2 | 2/2013 | Kugelev |
| 8,402,880 B2 | 3/2013 | Patel |
| 8,430,075 B2 | 4/2013 | Qiao |
| D687,125 S | 7/2013 | Hawes |
| 8,479,700 B2 | 7/2013 | Qiao |
| 8,511,218 B2 | 8/2013 | Cordes |
| 8,522,667 B2 | 9/2013 | Clemens |
| 8,528,585 B2 | 9/2013 | McGuire |
| 8,529,230 B1 | 9/2013 | Colley, III et al. |
| 8,534,691 B2 | 9/2013 | Schaffer |
| 8,613,886 B2 | 12/2013 | Qiao |
| D700,682 S | 3/2014 | Bayyouk et al. |
| 8,662,864 B2 | 3/2014 | Bayyouk |
| 8,662,865 B2 | 3/2014 | Bayyouk |
| 8,668,470 B2 | 3/2014 | Bayyouk |
| 8,707,853 B1 | 4/2014 | Dille |
| 8,733,313 B2 | 5/2014 | Sato |
| 8,784,081 B1 | 7/2014 | Blume |
| 8,814,139 B2 | 8/2014 | Griffin et al. |
| 8,814,432 B2 | 8/2014 | Thoma et al. |
| 8,828,312 B2 | 9/2014 | Yao |
| 8,870,554 B2 | 10/2014 | Kent |
| 8,893,806 B2 | 11/2014 | Williamson |
| 8,894,392 B1 | 11/2014 | Blume |
| 8,915,722 B1 | 12/2014 | Blume |
| 8,940,110 B2 | 1/2015 | Qiao |
| 8,955,850 B2 | 2/2015 | Saucerman et al. |
| 8,978,695 B2 | 3/2015 | Witkowski |
| 8,998,593 B2 | 4/2015 | Vicars |
| 9,010,412 B2 | 4/2015 | McGuire |
| 9,016,693 B1 | 4/2015 | Shek et al. |
| 9,067,346 B2 | 6/2015 | Kohn et al. |
| 9,103,448 B2 | 8/2015 | Nitkowski |
| 9,121,503 B2 | 9/2015 | Dietle et al. |
| 9,150,945 B2 | 10/2015 | Bei |
| 9,157,136 B2 | 10/2015 | Chou |
| 9,157,468 B2 | 10/2015 | Dille |
| 9,188,242 B2 | 11/2015 | Giove et al. |
| 9,206,910 B2 | 12/2015 | Kahn |
| D748,228 S | 1/2016 | Bayyouk |
| 9,260,933 B2 | 2/2016 | Artherholt |
| 9,261,195 B2 | 2/2016 | Toynbee |
| 9,273,543 B2 | 3/2016 | Baca |
| 9,284,631 B2 | 3/2016 | Radon |
| 9,284,953 B2 | 3/2016 | Blume |
| 9,285,040 B2 | 3/2016 | Forrest |
| 9,291,274 B1 | 3/2016 | Blume |
| 9,322,243 B2 | 4/2016 | Baca |
| 9,334,547 B2 | 5/2016 | Qiao |
| 9,340,856 B2 | 5/2016 | Otobe |
| 9,341,039 B2 | 5/2016 | Galle et al. |
| 9,359,921 B2 | 6/2016 | Hashimoto |
| 9,360,115 B2 | 6/2016 | Chaplin et al. |
| 9,365,913 B2 | 6/2016 | Imaizumi |
| 9,371,919 B2 | 6/2016 | Forrest |
| 9,376,930 B2 | 6/2016 | Kim |
| 9,377,019 B1 | 6/2016 | Blume |
| 9,382,940 B2 | 7/2016 | Lee |
| 9,416,887 B2 | 8/2016 | Blume |
| 9,435,454 B2 | 9/2016 | Blume |
| 9,441,776 B2 | 9/2016 | Bryne |
| 9,458,743 B2 | 10/2016 | Qiao |
| 9,464,730 B2 | 10/2016 | Bihlet |
| 9,500,195 B2 | 11/2016 | Blume |
| 9,506,382 B2 | 11/2016 | Yeager |
| 9,528,508 B2 | 12/2016 | Thomeer |
| 9,528,631 B2 | 12/2016 | McCarty |
| 9,534,473 B2 | 1/2017 | Morris |
| 9,534,691 B2 | 1/2017 | Miller |
| 9,556,761 B2 | 1/2017 | Koyama |
| 9,568,138 B2 | 2/2017 | Arizpe |
| 9,605,767 B2 | 3/2017 | Chhabra |
| 9,631,739 B2 | 4/2017 | Belshan |

(56) References Cited

U.S. PATENT DOCUMENTS

| | | |
|---|---|---|
| D787,029 S | 5/2017 | Bayyouk |
| 9,638,075 B2 | 5/2017 | Qiao |
| 9,638,337 B2 | 5/2017 | Witkowski |
| 9,650,882 B2 | 5/2017 | Zhang |
| 9,651,067 B2 | 5/2017 | Beschorner |
| 9,689,364 B2 | 6/2017 | Mack |
| 9,695,812 B2 | 7/2017 | Dille |
| 9,732,746 B2 | 8/2017 | Chandrasekaran |
| 9,732,880 B2 | 8/2017 | Haines |
| 9,745,968 B2 | 8/2017 | Kotapish |
| 9,784,262 B2 | 10/2017 | Bayyouk |
| 9,791,082 B2 | 10/2017 | Baxter et al. |
| 9,822,894 B2 | 11/2017 | Bayyouk |
| 9,845,801 B1 | 12/2017 | Shek |
| 9,857,807 B2 | 1/2018 | Baca |
| 9,915,250 B2 | 3/2018 | Brasche |
| 9,920,615 B2 | 3/2018 | Zhang |
| 9,927,036 B2 | 3/2018 | Dille |
| 9,945,362 B2 | 4/2018 | Skurdalsvold |
| 9,945,375 B2 | 4/2018 | Zhang |
| 9,957,770 B2 | 5/2018 | Averill et al. |
| 9,989,044 B2 | 6/2018 | Bayyouk |
| 10,029,540 B2 | 7/2018 | Seeger |
| D826,281 S | 8/2018 | Mead |
| 10,041,490 B1 | 8/2018 | Jahnke |
| 10,082,137 B2 | 9/2018 | Graham |
| 10,094,478 B2 | 10/2018 | Iijima |
| 10,113,679 B2 | 10/2018 | Shuck |
| 10,184,470 B2 | 1/2019 | Barnett, Jr. |
| 10,190,197 B2 | 1/2019 | Baker |
| 10,197,172 B2 | 2/2019 | Fuller |
| 10,215,172 B2 | 2/2019 | Wood |
| 10,221,848 B2 | 3/2019 | Bayyouk |
| 10,240,594 B2 | 3/2019 | Barnhouse, Jr. |
| 10,240,597 B2 | 3/2019 | Bayyouk |
| 10,247,182 B2 | 4/2019 | Zhang |
| 10,247,184 B2 | 4/2019 | Chunn |
| 10,260,634 B2 | 4/2019 | Lenhert et al. |
| 10,273,954 B2 | 4/2019 | Brown |
| 10,288,178 B2 | 5/2019 | Nowell |
| 10,309,182 B2 | 6/2019 | Jones et al. |
| 10,316,832 B2 | 6/2019 | Byrne |
| 10,330,097 B2 | 6/2019 | Skurdalsvold |
| 10,344,757 B1 | 7/2019 | Stark |
| 10,364,487 B2 | 7/2019 | Park |
| D856,498 S | 8/2019 | Bayyouk |
| 10,378,535 B2 | 8/2019 | Mahmood |
| 10,378,538 B2 | 8/2019 | Blume |
| 10,378,659 B2 | 8/2019 | Scott et al. |
| 10,393,113 B2 | 8/2019 | Wagner |
| 10,400,764 B2 | 9/2019 | Wagner |
| 10,415,348 B2 | 9/2019 | Zhang |
| 10,415,719 B2 | 9/2019 | Leboeuf et al. |
| D861,834 S | 10/2019 | Foster et al. |
| 10,428,406 B2 | 10/2019 | Yao |
| 10,428,949 B2 | 10/2019 | Miller |
| 10,436,193 B1 | 10/2019 | Jahnke |
| 10,443,456 B2 | 10/2019 | Hoeg |
| 10,465,680 B1 | 11/2019 | Guerra |
| 10,472,702 B2 | 11/2019 | Yeh |
| 10,487,528 B2 | 11/2019 | Pozybill |
| D871,455 S | 12/2019 | Crowsley |
| 10,519,070 B2 | 12/2019 | Sanders |
| 10,519,950 B2 | 12/2019 | Foster |
| 10,526,862 B2 | 1/2020 | Witkowski |
| 10,527,036 B2 | 1/2020 | Blume |
| 10,557,446 B2 | 2/2020 | Stecklein |
| 10,557,576 B2 | 2/2020 | Witkowski |
| 10,557,580 B2 | 2/2020 | Mendyk |
| 10,563,494 B2 | 2/2020 | Graham |
| 10,563,649 B2 | 2/2020 | Zhang |
| 10,570,491 B2 | 2/2020 | Hong |
| 10,576,538 B2 | 3/2020 | Kato |
| 10,577,580 B2 | 3/2020 | Abbas |
| 10,577,850 B2 | 3/2020 | Ozkan |
| 10,591,070 B2 | 3/2020 | Nowell |
| 10,605,374 B2 | 3/2020 | Takaki |
| D880,661 S | 4/2020 | Foster et al. |
| 10,626,856 B2 | 4/2020 | Coldren |
| 10,633,925 B2 | 4/2020 | Panda |
| 10,634,260 B2 | 4/2020 | Said |
| 10,640,854 B2 | 5/2020 | Hu |
| 10,655,623 B2 | 5/2020 | Blume |
| 10,663,071 B2 | 5/2020 | Bayyouk |
| 10,670,013 B2 | 6/2020 | Foster |
| 10,670,153 B2 | 6/2020 | Filipow |
| 10,670,176 B2 | 6/2020 | Byrne |
| 10,677,109 B2 | 6/2020 | Qiao |
| 10,677,240 B2 | 6/2020 | Graham |
| 10,677,365 B2 | 6/2020 | Said |
| 10,711,567 B2 | 7/2020 | Buckley |
| 10,711,754 B2 | 7/2020 | Nelson |
| 10,711,778 B2 | 7/2020 | Buckley |
| 10,718,441 B2 | 7/2020 | Myers |
| 10,731,523 B2 | 8/2020 | Qu |
| 10,731,643 B2 | 8/2020 | DeLeon |
| 10,738,928 B2 | 8/2020 | Arizpe |
| 10,753,490 B2 | 8/2020 | Fuller |
| 10,753,495 B2 | 8/2020 | Bayyouk |
| 10,767,520 B1 | 9/2020 | Hattiangadi |
| 10,771,567 B2 | 9/2020 | Sundaresan |
| 10,774,828 B1 | 9/2020 | Smith |
| 10,781,803 B2 | 9/2020 | Kumar |
| 10,787,725 B2 | 9/2020 | Fujieda |
| 10,801,627 B2 | 10/2020 | Warbey |
| 10,808,488 B2 | 10/2020 | Witkowski |
| 10,808,851 B1 | 10/2020 | Surjaatmadja et al. |
| 10,815,988 B2 | 10/2020 | Buckley |
| 10,815,989 B2 | 10/2020 | Naedler et al. |
| 10,830,360 B2 | 11/2020 | Frank |
| 10,837,556 B2 | 11/2020 | Chase et al. |
| 10,851,775 B2 | 12/2020 | Stark |
| 10,865,325 B2 | 12/2020 | Nakao |
| 10,895,325 B2 | 1/2021 | Nowell et al. |
| D910,820 S | 2/2021 | Grassl |
| 10,907,738 B2 | 2/2021 | Nowell |
| 10,914,171 B2 | 2/2021 | Foster |
| 10,914,383 B2 | 2/2021 | Kustermans et al. |
| 10,934,899 B2 | 3/2021 | Hattiangadi |
| 10,941,765 B2 | 3/2021 | Nowell |
| 10,941,866 B2 | 3/2021 | Nowell |
| 10,954,938 B2 | 3/2021 | Stark |
| 10,961,607 B2 | 3/2021 | Oshima |
| 10,962,001 B2 | 3/2021 | Nowell |
| D916,240 S | 4/2021 | Nowell |
| 10,968,717 B2 | 4/2021 | Tran |
| 10,988,834 B2 | 4/2021 | Lee |
| 10,989,321 B2 | 4/2021 | Hattiangadi |
| 10,995,738 B2 | 5/2021 | Blume |
| 11,009,016 B2 | 5/2021 | Berend |
| 11,028,662 B2 | 6/2021 | Rhodes |
| 11,041,570 B1 | 6/2021 | Buckley |
| 11,073,144 B1 | 7/2021 | Hurst et al. |
| 11,078,903 B2 | 8/2021 | Nowell |
| 11,104,981 B2 | 8/2021 | Chen |
| 11,105,185 B2 | 8/2021 | Spencer |
| 11,105,327 B2 | 8/2021 | Hurst |
| 11,105,328 B2 | 8/2021 | Bryne |
| 11,105,428 B2 | 8/2021 | Warbey |
| 11,111,915 B2 | 9/2021 | Bayyouk |
| 11,131,397 B2 | 9/2021 | Yan |
| D933,104 S | 10/2021 | Ellisor |
| D933,105 S | 10/2021 | Ellisor |
| D933,106 S | 10/2021 | Mullins |
| D933,107 S | 10/2021 | Mullins |
| 11,149,514 B2 | 10/2021 | Witkowski |
| 11,149,856 B2 | 10/2021 | Mattoni et al. |
| 11,156,221 B2 | 10/2021 | Stark et al. |
| 11,162,859 B2 | 11/2021 | Lei |
| 11,181,101 B2 | 11/2021 | Byrne |
| 11,181,108 B2 | 11/2021 | Brooks |
| 11,225,963 B2 | 1/2022 | Naedler et al. |
| 11,231,111 B2 | 1/2022 | Hurst |
| 11,242,849 B1 | 2/2022 | Smith |

(56) References Cited

U.S. PATENT DOCUMENTS

| | | |
|---|---|---|
| D949,202 S | 4/2022 | Sharpstone |
| 11,300,111 B2 | 4/2022 | Thomas et al. |
| 11,333,249 B2 | 5/2022 | Jones et al. |
| 11,353,117 B1 | 6/2022 | Smith |
| 11,359,615 B2 | 6/2022 | Thomas et al. |
| 11,384,756 B1 | 7/2022 | Smith |
| 11,391,374 B1 | 7/2022 | Ellisor |
| 11,421,679 B1 | 8/2022 | Mullins |
| 11,421,680 B1 | 8/2022 | Smith |
| 11,434,714 B2 | 9/2022 | Machocki |
| 11,434,900 B1 | 9/2022 | Alex |
| 11,441,683 B2 | 9/2022 | Mullins et al. |
| 11,454,321 B2 | 9/2022 | Mullins et al. |
| 11,473,686 B2 | 10/2022 | Bayyouk |
| 11,566,713 B2 | 1/2023 | Poremski |
| D980,876 S | 3/2023 | Smith |
| 11,608,896 B2 | 3/2023 | Al-Darra |
| D986,928 S | 5/2023 | Smith et al. |
| 11,692,544 B2 | 7/2023 | Chase |
| D997,992 S | 9/2023 | Smith et al. |
| 11,746,778 B2 | 9/2023 | Bayyouk |
| 11,761,441 B1 | 9/2023 | Alex et al. |
| D1,006,059 S | 11/2023 | Waniek |
| 11,846,356 B1 | 12/2023 | Ellisor |
| 11,891,988 B2 | 2/2024 | Mullins et al. |
| 11,920,684 B1 | 3/2024 | Xu et al. |
| 12,038,086 B2 | 7/2024 | Shuck |
| 12,049,889 B2 | 7/2024 | Ellisor et al. |
| 12,055,221 B2 | 8/2024 | Ellisor et al. |
| 12,140,240 B1 | 11/2024 | Xu |
| D1,061,623 S | 2/2025 | Newberg et al. |
| 12,247,557 B2 | 3/2025 | Avey et al. |
| 12,247,561 B2 | 3/2025 | Avey et al. |
| 12,270,394 B2 | 4/2025 | Ellisor et al. |
| 12,292,120 B1 | 5/2025 | Mullins et al. |
| 12,292,121 B2 | 5/2025 | Berryhill |
| 12,297,922 B1 | 5/2025 | Xu |
| 2002/0084004 A1 | 7/2002 | Takahashi |
| 2002/0124961 A1 | 9/2002 | Porter |
| 2002/0159914 A1 | 10/2002 | Yeh |
| 2003/0205864 A1 | 11/2003 | Dietle |
| 2003/0233910 A1 | 12/2003 | Jeong |
| 2004/0161351 A1 | 8/2004 | Forrest |
| 2004/0170507 A1 | 9/2004 | Vicars |
| 2004/0194576 A1 | 10/2004 | Ando |
| 2004/0234404 A1 | 11/2004 | Vicars |
| 2004/0255410 A1 | 12/2004 | Schonewille |
| 2004/0258557 A1 | 12/2004 | Shun |
| 2005/0095156 A1 | 5/2005 | Wolters |
| 2005/0098963 A1 | 5/2005 | Olsen |
| 2005/0200081 A1* | 9/2005 | Stanton ............... F16J 15/183 |
| | | 277/510 |
| 2005/0226754 A1 | 10/2005 | Orr |
| 2006/0002806 A1 | 1/2006 | Baxter |
| 2006/0027779 A1 | 2/2006 | McGuire |
| 2006/0045782 A1 | 3/2006 | Kretzinger |
| 2007/0086910 A1 | 4/2007 | Liang |
| 2007/0154342 A1 | 7/2007 | Tu |
| 2007/0261746 A1 | 11/2007 | Nomichi et al. |
| 2007/0273105 A1* | 11/2007 | Stanton ............... F04B 53/164 |
| | | 277/500 |
| 2007/0295411 A1 | 12/2007 | Schwegman |
| 2008/0031769 A1 | 2/2008 | Yeh |
| 2008/0042369 A1 | 2/2008 | Krywitsky et al. |
| 2008/0052014 A1 | 2/2008 | Toyosada |
| 2008/0092384 A1 | 4/2008 | Schaake |
| 2008/0240949 A1 | 10/2008 | Tackett et al. |
| 2008/0279706 A1 | 11/2008 | Gambier |
| 2009/0041611 A1 | 2/2009 | Sathian |
| 2009/0278069 A1 | 11/2009 | Blanco |
| 2009/0261575 A1 | 12/2009 | Bull |
| 2010/0143163 A1 | 6/2010 | Patel et al. |
| 2010/0230628 A1 | 9/2010 | Stefina |
| 2010/0272597 A1 | 12/2010 | Qiao |
| 2011/0079302 A1 | 4/2011 | Hawes |
| 2011/0142701 A1 | 6/2011 | Small |
| 2011/0189040 A1 | 8/2011 | Vicars |
| 2011/0255993 A1 | 10/2011 | Ochoa |
| 2011/0266752 A1 | 11/2011 | Kocurek |
| 2011/0296982 A1 | 12/2011 | Dille et al. |
| 2012/0141308 A1 | 6/2012 | Saini |
| 2012/0157786 A1 | 6/2012 | Pribanic |
| 2012/0163969 A1 | 6/2012 | Ongole |
| 2012/0259593 A1 | 10/2012 | El-Zein |
| 2012/0304821 A1 | 12/2012 | Ando |
| 2013/0020521 A1 | 1/2013 | Byrne |
| 2013/0037739 A1 | 2/2013 | Millard |
| 2013/0202457 A1 | 8/2013 | Bayyouk |
| 2013/0202458 A1 | 8/2013 | Byrne |
| 2013/0263932 A1 | 10/2013 | Baxter et al. |
| 2013/0319220 A1 | 12/2013 | Luharuka |
| 2014/0083541 A1 | 3/2014 | Chandrasekaran |
| 2014/0083547 A1 | 3/2014 | Hwang |
| 2014/0196883 A1 | 7/2014 | Artherholt |
| 2014/0260954 A1 | 9/2014 | Young |
| 2014/0286805 A1 | 9/2014 | Dyer |
| 2014/0319780 A1 | 10/2014 | Vertenten |
| 2014/0322034 A1 | 10/2014 | Bayyouk |
| 2014/0322050 A1 | 10/2014 | Marette et al. |
| 2014/0348677 A1 | 11/2014 | Moeller |
| 2015/0127308 A1 | 5/2015 | Thomas, Jr. et al. |
| 2015/0132157 A1 | 5/2015 | Whaley |
| 2015/0144826 A1 | 5/2015 | Bayyouk |
| 2015/0147194 A1 | 5/2015 | Foote |
| 2015/0219096 A1 | 8/2015 | Jain |
| 2015/0300332 A1 | 10/2015 | Kotapish |
| 2015/0368775 A1 | 12/2015 | Baker |
| 2016/0201169 A1 | 7/2016 | Vecchio |
| 2016/0215588 A1 | 7/2016 | Belshan |
| 2016/0238156 A1 | 8/2016 | Hubenschmidt |
| 2016/0245280 A1 | 8/2016 | Todorov |
| 2016/0258433 A1 | 9/2016 | Belshan et al. |
| 2016/0319626 A1 | 11/2016 | Dille |
| 2016/0319805 A1 | 11/2016 | Dille |
| 2016/0327165 A1 | 11/2016 | Sundararajan |
| 2017/0051738 A1 | 2/2017 | Horning |
| 2017/0067459 A1 | 3/2017 | Bayyouk |
| 2017/0089334 A1 | 3/2017 | Jahnke |
| 2017/0089470 A1 | 3/2017 | Filipow et al. |
| 2017/0089473 A1 | 3/2017 | Nowell |
| 2017/0097107 A1 | 4/2017 | Hotz |
| 2017/0102101 A1 | 4/2017 | Duval-Arnould |
| 2017/0122055 A1 | 5/2017 | Embury |
| 2017/0159655 A1 | 6/2017 | Morreale |
| 2017/0175799 A1 | 6/2017 | Arnold |
| 2017/0204852 A1 | 7/2017 | Barnett, Jr. |
| 2017/0218951 A1 | 8/2017 | Graham |
| 2017/0218993 A1 | 8/2017 | Freed |
| 2017/0268674 A1 | 9/2017 | Barbera et al. |
| 2017/0297149 A1 | 10/2017 | Shinohara |
| 2017/0298932 A1 | 10/2017 | Wagner |
| 2017/0314097 A1 | 11/2017 | Hong |
| 2017/0342776 A1 | 11/2017 | Bullock |
| 2017/0342976 A1 | 11/2017 | Reddy |
| 2018/0017173 A1 | 1/2018 | Nowell |
| 2018/0058431 A1 | 3/2018 | Blume |
| 2018/0073653 A1 | 3/2018 | Bayyouk |
| 2018/0202434 A1 | 7/2018 | Barnhouse, Jr. |
| 2018/0298894 A1 | 10/2018 | Wagner |
| 2018/0312946 A1 | 11/2018 | Gigliotti, Jr. |
| 2018/0320258 A1 | 11/2018 | Stewart |
| 2018/0340245 A1 | 11/2018 | Kernion |
| 2018/0354081 A1 | 12/2018 | Kalyani |
| 2019/0011051 A1* | 1/2019 | Yeung ............... F04B 53/10 |
| 2019/0017503 A1 | 1/2019 | Foster |
| 2019/0024198 A1 | 1/2019 | Hong |
| 2019/0024225 A1 | 1/2019 | Tang |
| 2019/0032685 A1 | 1/2019 | Foster |
| 2019/0032720 A1 | 1/2019 | Bayyouk |
| 2019/0047049 A1 | 2/2019 | Fujieda |
| 2019/0049052 A1 | 2/2019 | Shuck |
| 2019/0063427 A1 | 2/2019 | Nowell |
| 2019/0071755 A1 | 3/2019 | Lee |
| 2019/0072088 A1 | 3/2019 | DeLeon |

(56) References Cited

U.S. PATENT DOCUMENTS

| | | |
|---|---|---|
| 2019/0072089 A1 | 3/2019 | Buckley |
| 2019/0085806 A1 | 3/2019 | Meibgeier |
| 2019/0085978 A1 | 3/2019 | Chase |
| 2019/0101109 A1 | 4/2019 | Cortes |
| 2019/0107226 A1 | 4/2019 | Bayyouk |
| 2019/0120389 A1 | 4/2019 | Foster |
| 2019/0136842 A1* | 5/2019 | Nowell ................ F04B 1/0461 |
| 2019/0145400 A1 | 5/2019 | Graham |
| 2019/0145568 A1* | 5/2019 | Nick .................... F16L 55/115 138/96 R |
| 2019/0154033 A1 | 5/2019 | Brooks |
| 2019/0170137 A1 | 6/2019 | Chase |
| 2019/0170138 A1 | 6/2019 | Bayyouk |
| 2019/0194786 A1 | 6/2019 | Chuang |
| 2019/0226058 A1 | 7/2019 | Fujieda |
| 2019/0226476 A1 | 7/2019 | Stark et al. |
| 2019/0063430 A1 | 8/2019 | Byrne |
| 2019/0242373 A1 | 8/2019 | Wernig |
| 2019/0247957 A1 | 8/2019 | Stribling |
| 2019/0264683 A1 | 8/2019 | Smith |
| 2019/0292633 A1 | 9/2019 | Porret |
| 2019/0301314 A1 | 10/2019 | Kamo |
| 2019/0301447 A1 | 10/2019 | Skurdalsvold |
| 2019/0316685 A1 | 10/2019 | Wang |
| 2019/0331245 A1 | 10/2019 | Gable et al. |
| 2019/0360483 A1 | 11/2019 | Nowell |
| 2019/0368614 A1 | 12/2019 | Hurst |
| 2019/0376508 A1 | 12/2019 | Wagner |
| 2020/0056272 A1 | 2/2020 | Hong |
| 2020/0063899 A1 | 2/2020 | Witkowski |
| 2020/0070034 A1 | 3/2020 | Sukup et al. |
| 2020/0072369 A1 | 3/2020 | Singley et al. |
| 2020/0080660 A1 | 3/2020 | Dyer |
| 2020/0080661 A1 | 3/2020 | Mullins |
| 2020/0132195 A1 | 4/2020 | Coombs |
| 2020/0157663 A1 | 5/2020 | Yang |
| 2020/0158123 A1 | 5/2020 | Chen |
| 2020/0173317 A1 | 6/2020 | Keating |
| 2020/0023245 A1 | 7/2020 | Blume |
| 2020/0208776 A1 | 7/2020 | Bayyouk |
| 2020/0217424 A1 | 7/2020 | Rasmussen |
| 2020/0232455 A1 | 7/2020 | Blume |
| 2020/0240531 A1 | 7/2020 | Nowell |
| 2020/0256149 A1 | 8/2020 | Witkowski |
| 2020/0284253 A1 | 9/2020 | Foster |
| 2020/0284365 A1 | 9/2020 | Bayyouk |
| 2020/0290118 A1 | 9/2020 | Chen |
| 2020/0291731 A1 | 9/2020 | Haiderer |
| 2020/0300240 A1 | 9/2020 | Nowell |
| 2020/0300367 A1 | 9/2020 | Caglio et al. |
| 2020/0308683 A1 | 10/2020 | Xue |
| 2020/0347843 A1 | 11/2020 | Mullins |
| 2020/0355182 A1 | 11/2020 | DeLeon |
| 2020/0362970 A1 | 11/2020 | Hurst |
| 2020/0392613 A1 | 12/2020 | Won |
| 2020/0393054 A1 | 12/2020 | Fuller |
| 2020/0399979 A1 | 12/2020 | Webster |
| 2020/0400003 A1 | 12/2020 | Webster |
| 2020/0400130 A1 | 12/2020 | Poehls |
| 2020/0400132 A1 | 12/2020 | Kumar |
| 2020/0400140 A1 | 12/2020 | Bayyouk |
| 2020/0400234 A1 | 12/2020 | Mullins et al. |
| 2020/0400242 A1 | 12/2020 | Spencer |
| 2021/0010113 A1 | 1/2021 | Qiao |
| 2021/0010470 A1 | 1/2021 | Blume |
| 2021/0017830 A1 | 1/2021 | Witkowski |
| 2021/0017982 A1 | 1/2021 | Bayyouk |
| 2021/0017983 A1 | 1/2021 | Myers |
| 2021/0025497 A1 | 1/2021 | Tsuji |
| 2021/0040836 A1 | 2/2021 | Baskin |
| 2021/0054486 A1 | 2/2021 | Kim |
| 2021/0062944 A1 | 3/2021 | Lee |
| 2021/0102630 A1 | 4/2021 | Nowell |
| 2021/0108734 A1 | 4/2021 | Nowell |
| 2021/0130936 A1 | 5/2021 | Wu |
| 2021/0146397 A1 | 5/2021 | Mittag et al. |
| 2021/0148471 A1 | 5/2021 | Murugesan |
| 2021/0180156 A1 | 6/2021 | Kim |
| 2021/0190053 A1 | 6/2021 | Wagner |
| 2021/0190223 A1 | 6/2021 | Bayyouk |
| 2021/0197524 A1 | 7/2021 | Maroli |
| 2021/0215071 A1 | 7/2021 | Oikawa |
| 2021/0215154 A1 | 7/2021 | Nowell |
| 2021/0230987 A1 | 7/2021 | Tanner |
| 2021/0239111 A1 | 8/2021 | Zitting |
| 2021/0246537 A1 | 8/2021 | Maroli |
| 2021/0260704 A1 | 8/2021 | Hu |
| 2021/0270261 A1 | 9/2021 | Zhang |
| 2021/0285551 A1 | 9/2021 | Renollett |
| 2021/0310484 A1 | 10/2021 | Myers |
| 2021/0381504 A1 | 12/2021 | Wagner |
| 2021/0381615 A1 | 12/2021 | Riedel |
| 2021/0388832 A1 | 12/2021 | Byrne |
| 2022/0026326 A1 | 1/2022 | Wang |
| 2022/0034402 A1 | 2/2022 | Kiani |
| 2022/0056906 A1 | 2/2022 | Lawson et al. |
| 2022/0065063 A1 | 3/2022 | Xu et al. |
| 2022/0163031 A1 | 5/2022 | Chase |
| 2022/0163032 A1 | 5/2022 | Chase |
| 2022/0163118 A1 | 5/2022 | Maffezzoli et al. |
| 2022/0243723 A1 | 8/2022 | Herold et al. |
| 2022/0282719 A1 | 9/2022 | Barnhouse |
| 2022/0320790 A1 | 10/2022 | Demaratos |
| 2022/0349472 A1 | 11/2022 | Ellisor |
| 2022/0390055 A1 | 12/2022 | Ellisor |
| 2022/0403839 A1 | 12/2022 | Mullins |
| 2023/0041201 A1 | 2/2023 | Myers et al. |
| 2023/0129538 A1 | 4/2023 | Miller et al. |
| 2023/0130824 A1 | 6/2023 | Belshan et al. |
| 2023/0184241 A1 | 6/2023 | Avey et al. |
| 2023/0220840 A1 | 7/2023 | Avey et al. |
| 2023/0258175 A1 | 8/2023 | Figgs et al. |
| 2023/0279991 A1 | 9/2023 | Avey et al. |
| 2023/0332596 A1 | 10/2023 | Chase |
| 2023/0383743 A1 | 11/2023 | Brock et al. |
| 2023/0383859 A1 | 11/2023 | Wiegand et al. |
| 2023/0407864 A1 | 12/2023 | Alex et al. |
| 2024/0042627 A1 | 2/2024 | Wang et al. |
| 2024/0102460 A1 | 3/2024 | Kachovskiy et al. |
| 2024/0117882 A1 | 4/2024 | Ellisor |
| 2024/0200656 A1 | 6/2024 | Avey |
| 2024/0200666 A1 | 6/2024 | Leake |
| 2024/0209945 A1 | 6/2024 | Prate et al. |
| 2024/0262067 A1 | 8/2024 | Iversen et al. |
| 2024/0309724 A1 | 9/2024 | Miller et al. |
| 2024/0369139 A1 | 11/2024 | Ellisor |
| 2024/0376892 A1 | 11/2024 | Ellisor |
| 2024/0376984 A1 | 11/2024 | Ellisor |
| 2024/0384795 A1 | 11/2024 | Barnett et al. |
| 2024/0418164 A1 | 12/2024 | Peer |
| 2025/0027486 A1 | 1/2025 | Alex et al. |
| 2025/0052325 A1 | 2/2025 | Berryhill |
| 2025/0075818 A1 | 3/2025 | Xu |

FOREIGN PATENT DOCUMENTS

| | | |
|---|---|---|
| CN | 102748483 | 10/2012 |
| CN | 202545162 U | 11/2012 |
| CN | 203257342 U | 10/2013 |
| CN | 204040978 U | 12/2014 |
| CN | 104329464 A | 2/2015 |
| CN | 204738957 U | 11/2015 |
| CN | 205315253 U | 6/2016 |
| CN | 109458326 A | 3/2019 |
| CN | 209261799 U | 8/2019 |
| CN | 110374522 A | 10/2019 |
| CN | 209469613 U | 10/2019 |
| CN | 111005695 A | 4/2020 |
| CN | 111073186 A | 4/2020 |
| CN | 102410194 | 4/2021 |
| DE | 3126421 | 1/1983 |
| DE | 102009001560 A1 | 9/2010 |
| DE | 202012104058 U1 | 3/2014 |
| EP | 0 414 955 | 3/1991 |

(56) References Cited

FOREIGN PATENT DOCUMENTS

| | | |
|---|---|---|
| EP | 0520567 A1 | 12/1992 |
| EP | 3336356 A1 | 6/2018 |
| EP | 3696408 A1 | 8/2020 |
| GB | 2123100 | 1/1986 |
| GB | 2240592 | 8/1991 |
| JP | 2021025560 A | 2/2021 |
| WO | 2016/024939 | 2/2016 |
| WO | 2021195572 | 9/2021 |
| WO | 2022167341 A1 | 8/2022 |
| WO | 2024026432 | 2/2024 |
| WO | 2024076786 A1 | 4/2024 |

OTHER PUBLICATIONS

Carraro et al. "A Damage Based Model for Crack Initiation in Unidirectional Composites Under Multiaxial Cyclic Loading", Composite Science and Technology 99 (2014), 154-163, May 16, 2014.

Albinmousa et al., "Cyclic Axial and Cyclic Torsional Behaviour of Extruded AZ31B Magnesium Alloy", International Journal of Fatigue 33 (2011), 1403-1416, 2011.

Horstemeyer et al., "Universal Material Constants For Multistage Fatigue (MSF) Modeling of the Process-Structure-Property (PSP) Relations of A000, 2000, 5000, and 7000 Series Aluminum Alloys", Integrating Materials and Manufacturing Innovation, vol. 9 (2020), 157-180, Jun. 22, 2020.

Guan et al., "Model Selection, Updating, and Averaging for Probabilistic Fatigue Damage Prognosis", Journal of Structural Safety, Mar. 11, 2011.

Frick et al., "Orientation-Independent Pseudoelasticity in Small-Scale Niti Compression Pillars", Scripta Materialia 59(12), 7-10, 2008.

Naghipour et al., "Fatigue Analysis of Notched Laminates: a Time-Efficient Macro-Mechanical Approach", Ohio Aerospace Institute, Cleveland, 2016.

Declaration of Duncan Hall from Internet Archive/Wayback Machine, Feb. 3, 2021, Kerr Plunger Pump Manuals, 20 pages.

Michael Agnes, Editor, Webster's New World College Dictionary, Fourth Edition, 1999, 5 pages.

Weir SPM Oil & Gas, Grooveless Fluid End, 2008, 1 page.

Weir SPM Oil & Gas, Weir SPM General Catalog, 2009, 40 pages.

Weir SPM Oil & Gas, Well Service Pump Reference Guide, 2008, 55 pages.

*Intellectual Ventures I LLC v VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.

*Vulcan Industrial Holding, LLC et al. v. Kerr Machine Co.* Case No. 4:21-cv-433, Document 1, Complaint for Declaratory Judgment of Patent Non-Infringement, Feb. 9, 2021, 17 pages.

*Trilogy Enterprises, Inc., v. Trilogy Education Services, LLC*, Case. No. 6:19-cv-199-ADA-JCM, Document 35, Fifth Amended Scheduling Order, Sep. 8, 2020, 4 pages.

*Dr. Corneliu Bolbocean v Baylor University*, Case No. 6:19-CV-00465-ADA-JCM, Document 34, Scheduling Order, Apr. 6, 2020, 4 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044-ADA, Document 4, Plaintiff's Amended Complaint for Patent Infringement and Jury Demand, Jan. 19, 2021, 30 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044, Document 1, Plaintiff's Original Complaint for Patent Infringement and Jury Demand, Jan. 19, 2021, 47 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044-ADA, Document 10, Plaintiff's Second Amended Complaint for Patent Infringement and Jury Demand, Feb. 1, 2021, 88 pages.

*Kerr Machine Co., v Vulcan Industrial Holdings, LLC, Vulcan Energy Services, LLC, Cizion, LLC*, Case No. W-20- CV-00200-ADA-24, Order Setting Trial Date, Jun. 14, 2020, 1 page.

*Kerr Machine Co., v Vulcan Industrial Holdings, LLC, Vulcan Energy Services, LLC, Cizion, LLC*, Case No. W-20- CV-00200-ADA-29, Order Setting Trial Date, Aug. 2, 2020, 1 page.

*Kerr Machine Co., v. Vulcan Industrial Holdings, LLC*, Case. No. 6:20-CV-00200-ADA, Affidavit of Service, Apr. 7, 2020, 1 page.

*Kerr Machine Co., v Vulcan Energy Services, LLC, Vulcan Industrial Holdings, LLC, and Cizion, LLC d/b/a/ Vulcan Industrial Manufacturing*, Case No. 6:20-CV-00200-ADA, Plaintiff's First Amended Complaint for Patent Infringement and Jury Demand, Jun. 4, 2020, 11 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.

*Kerr Machine Co., v Vulcan Industrial Holdings, LLC*, Case No. 6:20-CV-00200-ADA, Plaintiff's Preliminary Infringement Contentions, May 22, 2020, 50 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:20-CV-00200-ADA, Defendants' Preliminary Invalidity Contentions, Aug. 13, 2020, 29 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:20-CV-00200-ADA, Document 34, Scheduling Order, Aug. 11, 2020, 3 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:20-CV-00200-ADA, Document 38, Plaintiff's Second Amended Complaint for Patent Infringement and Jury Demand, Sep. 25, 2020, 11 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:20-CV-00200-ADA, Document 5, Standing Order regarding Scheduled Hearings In Civil Cases in Light of Chief Judge Garcia's 24 Amended Order, Mar. 24, 2020, 4 pages.

*Kerr Machine Co., v Vulcan Industrial Holdings, LLC, Vulcan Energy Services, LLC, and Cizion, LLC d/b/a/ Vulcan Industrial Manufacturing*, Civil Docket for Case No. 6:20-cv-00200-ADA, accessed Sep. 11, 2020, 7 pages.

*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 54, Claim Construction Order, Dec. 3, 2020, 3 pages.

*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Docket Entry, Aug. 2, 2020, 1 page.

*Kerr Machine Co., v Vulcan Industrial Holdings, LLC*, Case No. 6:20-CV-00200, Document 1, Plaintiff's Original Complaint for Patent Infringement and Jury Demand, Mar. 19, 2020, 39 pages.

*Adriana del Rocio Barberena-Rovira, et al., v Kuiper Dairy, LLC*, et al., Case No. 6:20-CV-00250-ADA-JCM, Document 20, Scheduling Order, Jul. 22, 2020, 4 pages.

*Acquanlan Deonshay Harris v. Cenlar, FSB*, Case No. 6:20-CV-00271-ADA-JCM, Document 13, Scheduling Order, Aug. 20, 2020, 4 pages.

*Senior Living Properties, LLC c. Ironshore Speciality, Insurance Company*, Case No. 6:20-CV-00282-ADA-JCM, Document 12, Scheduling Order, Jul. 7, 2020, 4 pages.

(56) References Cited

OTHER PUBLICATIONS

*Dionne Bracken, Individually and as Next Friend of A.M.B.,* v *Michael D. Ashcraft and Envirovac Waste Transport Systems, Inc.,* Case No. 6:20-CV-00308-ADA-JCM, Document 17, Scheduling Order, Jul. 28, 2020, 4 pages.
*Kendra Coufal* v. *Roger Lee Thomas and Apple Logistics, Inc.,* Case No. 6:20-CV-00356-ADA-JCM, Document 12, Scheduling Order, Jul. 28, 2020, 4 pages.
*Tipton International, Inc.,* v. *Vetbizcorp, LLC and Samuel Cody,* Case No. 6:20-CV-00554-ADA-JCM, Document 8, Scheduling Order, Aug. 20, 2020, 4 pages.
*Dynaenergetics GmbH & Co. KG and Dynaenergetics US, Inc.,* v. *Hunting Titan, Ltd.; Hunting Titan, Inc.; and Hunting Energy Services, Inc.,* Case No. H-17-3784, Order, Sep. 4, 2020, 2 pages.
Slip Opinion, In re Sand Revolution LLC, Case No. 2020-00145 (Fed. Cir. Sep. 28, 2020), 3 pages.
In re Vulcan Industrial Holdings, LLC, Case No. 2020-00151 (Fed. Cir. Sep. 29, 2020), Petition for Writ of Mandamus, 43 pages.
*Densys Ltd.,* v. *3Shape Trios A/S and 3Shape A/S,* Case No. WA:19-CV-00680-ADA, Document 27, Scheduling Order, Apr. 8, 2020, 4 pages.
*Kerr Machine Co.* vs. *Vulcan Industrial Holdings, LLC,* Case No. WA:20-CV-00200-ADA, Order Setting Markman Hearing, May 29, 2020, 1 page.
Sur-Lock Liner Retention System—Product Brochure (p. 16) (Year: 2017).
Sur-Lock Liner Retention System—Video (https://premiumoilfield.com/performance-enhancements/sur-lock/sur-lock-liner-retention-system.html) (https://www.youtube.com/watch?v=6NZGeD5NkF8) (Year: 2017).
U.S. Appl. No. 17/241,680 titled "Fluid End and Center Feed Suction Manifold" filed Apr. 27, 2021.
Vulcan, High-Impact Replacement Parts, Fortified Valves and Seats, found at: https://www.vulcanindustrial.com/energy-products/replacement-parts.
U.S. Appl. No. 16/814,267, 194 pages.
U.S. Appl. No. 17/120,121, 110 pages.
U.S. Appl. No. 62/234,483, 45 pages.
U.S. Appl. No. 62/315,343, 41 pages.
U.S. Appl. No. 62/318,542, 44 pages.
U.S. Appl. No. 62/346,915, 41 pages.
U.S. Appl. No. 62/379,462, 24 pages.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Gardner Denver, GD 2500Q HDF Frac & Well Service Pump, 2 pages.
Cutting Tool Engineering, "Groove milling," Aug. 1, 2012, https://www.ctemag.cojm/news/articles/groove-milling, accessed May 13, 2020, 11 pages.
VargusUSA, "Groovex Innovative Grooving Solutions—Groove Milling," Dec. 12, 2011, http://www.youtube.com/watch?v=vrFxHJUXjvk, 68 pages.
Kerr Pumps, Kerr KA-3500B/KA-3500BCB Plunger Pump Parts and Service Manual, 41 pages.
Kerr Pumps, Kerr KD-1250B/KD-1250BCB Plunger Pump Service Manual, 38 pages.
Kerr Pumps, Kerr KJ-2250B and KJ-2250BCB Plunger Pump Service Manual, 38 pages.
Kerr Pumps, Kerr KM-3250B / KM-3250BCB Plunger Pump Service Manual, 35 pages.
Kerr Pumps, Kerr KP-3300B / KP-3300BCB Plunger Pump Service Manual, 41 pages.
Kerr Pumps, Kerr KT-3350B/BCB KT-3400BCB Plunger Pump Service Manual, 46 pages.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, 77 Federal district court cases for Alan D Albright of W.D. Tex., http://law.lexmachina.com/court/txwd/judge/5198506/cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Lex Machina, 6:20-cv-00200-ADA, *Kerr Machine Co.* v. *Vulcan Industrial Holdings, LLC* Docket Entries, https://law.lexmachina.com/cases/2004206451#docket-entries, 6 pages.
Jonathan Maes, "Machining Square Inside Corners: Conquer the Nightmare!," accessed Sep. 8, 2020, https://makeitfrommetal.com/machining-square-inside-corners-the-night.., 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 page.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Caterpillar, WS255 Quintuplex Well Stimulation Pump, 2 pages.
Gardner Denver Pumps, Redline Series Brochure, 3 pages.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.

(56) References Cited

OTHER PUBLICATIONS

Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.
Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.
White Star Pump Co., "Maintenance Manual: Triplex Pump WS-1300/1600," 2005, http://www.whitestarpump.com/ES/docs/user_t.pdf, 45 pages.
KerrPumps, "Super Stainless Steel Better Than The Best," http://kerrpumps.com/superstainless?gclid=EAlalQobChMlg470482q6wlVilTICh2XPA-qEAAYASAAEgKrxPD_BwE, 2013, last accessed: Aug. 21, 2020, 6 pages.
KerrPumps, "Frac One Pumps—Fluid End—Fracing," http://kerrpumps.com/fracone, 2013, last accessed: Aug. 21, 2020, 3 pages.
KerrPumps, "KerrPumps—Frac Pump & Mud Pump Fluid End—Fluid End Pump," http://kerrpumps.com/fluidends, 2013, last accessed: Aug. 21, 2020, 6 pages.
Vulcan Industrial, "Vulcan," http://www.vulcanindustrial.com/, 2019, last accessed: Aug. 21, 2020, 3 pages.
Vulcan Industrial, "Vulcan," http://www.vulcanindustrial.com/fluid-ends/, 2019, last accessed: Aug. 21, 2020, 3 pages.
COVERT Manufacturing, Inc., "Fluid End Block: Covert Manufacturing", (site visited Jul. 30, 2021), covertmfg.com, URL: <http://www.covertmfg.com/our-capabilities/fluid-end-block/> (Year: 2021).
Kerr Pumps, "the most advanced fluid ends", (site visited Aug. 5, 2021), Kerrpumps.com, URL: < http://kerrpumps.com/fluidends> (Year: 2021).
Shandong Baorun, 2250 Triplex Plunger Pump Fluid End Exchangeable with Spm, (site visited Aug. 5, 2021), made-in-china.com, URL: < https://sdbaorun.en.made-in-china.com/product/wNixIDXYrshL/China-2250-Triplex-Plunger-Pump-Fluid-End-Exchangeable-with-Spm.html> (Year: 2021).
John Miller, "The Reciprocating Pump, Theory, Design and Use," 1995, 2nd Edition, Krieger Publishing Company, Malabar, Florida, 1 page.
"QIH-1000 HP Quintuplex," Dixie Iron Works, 2017, https://web.archive.org/web/20171031221150/http:/www.diwmsi.com/pumping/qi-1000/.
Technical Manual MSI Hybrid Well Service Pump Triplex and Quintuplex Models, Dixie Iron Works, Mar. 12, 2019, 88 pages. https://www.diwmsi.com/pumping/qi-1000/.
Carpenter, "CarTech Ferrium C61 Data Sheet," 2015, 2 pages.
The American Heritage Dictionary, Second College Edition, 1982, 6 pages.
Matthew Bultman, "Judge in West Texas Patent Hot Spot Issues Revised Guidelines," Sep. 23, 2020, Bloomberg Law News, 3 pages.
David L. Taylor, "Machine Trades Blueprint Reading: Second Edition," 2005, 3 pages.
Blume, U.S. Pat. No. 6,544,012, issued Apr. 8, 2003, Fig. 12A.
Caterpillar, "Cat Fluid Ends For Well Stimulation Pumps," 2015, 2 pages.
Claim Chart for U.S. Pat. No. 6,544,012, 23 pages.
Claim Chart for U.S. Pat. No. 7, 186,097, 22 pages.
Claim Chart for U.S. Pat. No. 7,845,413, 8 pages.
Claim Chart for U.S. Pat. No. 9,534,472, 8 pages.
Claim Chart for U.S. Pat. Pub. No. 2013/0319220, 17 pages.
Claim Chart for U.S. Pat. Pub. No. 2014/0348677, 10 pages.
Claim Chart for U.S. Pat. Pub. No. 2015/0132157, 23 pages.
Claim Chart for "GD-3000," 9 pages.
Claim Chart for "NOV-267Q," 14 pages.
Collins English Dictionary, "annular," https://www.collinsdictionary.com/us/dictionary/english/annular, 2021, 4 pages.
Collins English Dictionary, "circumference," https://www.collinsdictionary.com/us/dictionary/english/circumference, 2021, 7 pages.
Collins English Dictionary, "plug," https://www.collinsdictionary.com/us/dictionary/english/plug, 2021, 17 pages.
Collins English Dictionary, "profile," https://www.collinsdictionary.com/us/dictionary/english/profile, 2021, 10 pages.
Collins English Dictionary, "sleeve," "therethrough," "through," "tube," and "tubular," 8 pages.
Collins English Dictionary, "space," https://www.collinsdictionary.com/us/dictionary/english/space, 2021, 13 pages.
Collins English Dictionary, "stairstep," https://www.collinsdictionary.com/us/dictionary/english/stairstep, 2021, 3 pages.
Congressional Record—Extensions of Remarks, Apr. 18, 2007, pp. E773-E775.
Congressional Record, Mar. 7, 2011, 31 pages.
"Declaration of Steven M. Tipton, Ph.D., P.E., Submitted with Patent Owner's Preliminary Response," Sep. 11, 2020, 155 pages.
"Declaration of William D. Marscher, P.E.—U.S. Pat. No. 10,914,171," Feb. 11, 2021, 308 pages.
"Declaration of William D. Marscher, P.E.—U.S. Pat. No. 10,591,070," May 25, 2020, 209 pages.
Email dated Sep. 22, 2020 in PGR2020-00065, 3 pages.
Email dated Sep. 25, 2020 in *Kerr Machine* v *Vulcan Industrial Holdings,* 1 page.
U.S. Pat. No. 10,288,178, 353 pages.
U.S. Pat. No. 10,519,950, 142 pages.
U.S. Pat. No. 10,591,070, 168 pages.
U.S. Appl. No. 16/722,139, 104 pages.
U.S. Appl. No. 13/773,271, 250 pages.
U.S. Appl. No. 15/719,124, 183 pages.

* cited by examiner

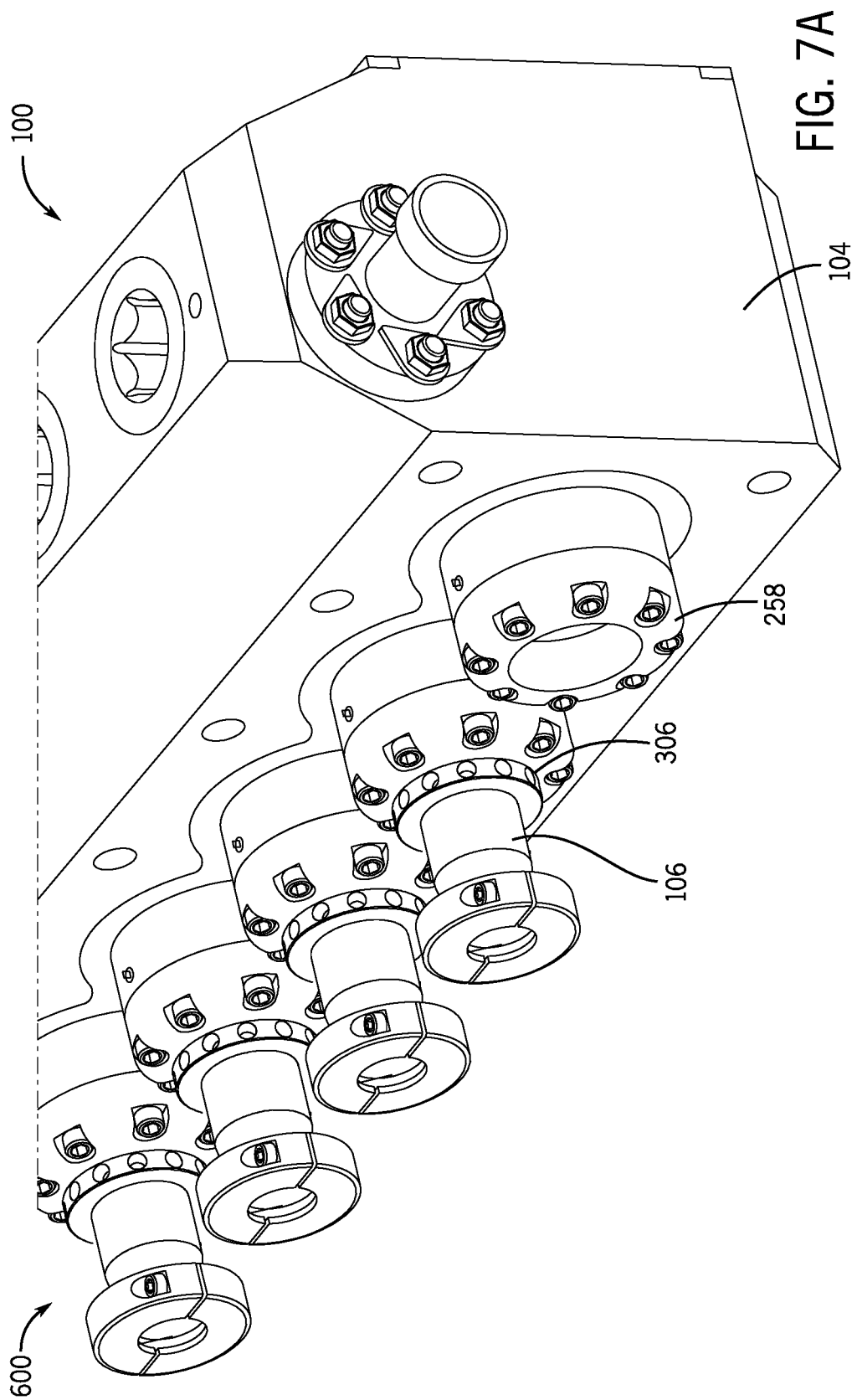

PACKING ASSEMBLY WITH THREADED SLEEVE FOR INTERACTION WITH AN INSTALLATION TOOL

CROSS-REFERENCE TO RELATED APPLICATIONS

This application is a divisional of U.S. patent application Ser. No. 17/308,163, titled "PACKING ASSEMBLY WITH THREADED SLEEVE FOR INTERACTION WITH AN INSTALLATION TOOL," filed May 5, 2021, which is now U.S. Pat. No. 11,421,679 issued Aug. 23, 2022, which is a continuation-in-part of U.S. patent application Ser. No. 16/916,657, titled "SLEEVED PACKING BORE SEALING SYSTEM," filed Jun. 30, 2020, the full disclosures of which are hereby incorporated by reference in their entirety for all purposes.

TECHNICAL FIELD

Embodiments of the subject matter disclosed herein generally relate to pump systems, and in particular to sealing systems.

BACKGROUND

Pumping systems may be used in a variety of applications, such as industrial applications where pumping systems are used to elevate a working fluid pressure. One such application is hydraulic fracturing systems, where high pressure pumps are used to increase a fluid pressure of a working fluid (e.g., fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas. In many applications, reciprocating pumps are used where a fluid is introduced into a fluid end inlet passage and out through an outlet passage. A plunger reciprocates within a bore to add energy to the fluid. Due to the particulates and corrosive nature of the working fluid, various sealing surfaces become eroded or otherwise damaged.

SUMMARY

Applicants recognized the problems noted above herein and conceived and developed embodiments of systems and methods, according to the present disclosure, for sealing systems.

In accordance with one or more embodiments, a fluid end includes a first bore extending through a body toward a pressure chamber. The fluid end also includes a second bore extending through the body and intersecting the pressure chamber. The fluid end further includes a packing assembly positioned within the first bore. The packing assembly includes a seal positioned against an inner face of the first bore. The packing assembly also includes a sleeve positioned against the seal, both the sleeve and the seal arranged at a radially outward location of the first bore, the sleeve having radially outwardly facing coupling components at an end opposite the seal. The packing assembly further includes a ring positioned radially inward of the seal. The packing assembly includes a plurality of packing components positioned on the ring.

In accordance with another embodiment, a packing assembly includes a packing sleeve having a first end and a second end, the first end having a coupling component and configured to extend, at least partially, axially out of bore of a fluid end block. The packing assembly also includes a seal adapted to sit on a shelf formed within the bore, the seal positioned for engagement by the second end of the packing sleeve. The packing assembly further includes a ring configured to sit on the shelf, radially inward of the seal, at least a portion of the ring axially overlapping the second end along the bore. The packing assembly includes a plurality of packing components configured to sit on a ring shelf, the plurality of packing components to be positioned radially inward of the sleeve and the seal.

In accordance with another embodiment, a method includes threadingly engaging a first sleeve arranged within a bore of a pump assembly via a tool. The method also includes coupling the tool to the pump assembly. The method further includes axially removing the first sleeve from the bore, responsive to at least partial first operation of the pump assembly. The method also includes threadingly engaging a second sleeve to the tool. The method includes axially installing the second sleeve into the bore, responsive to at least partial second operation of the pump assembly.

In accordance with another embodiment, a fluid end includes a first bore extending through a body toward a pressure chamber. The fluid end also includes a second bore extending through the body and intersecting the pressure chamber. The fluid end further includes a packing assembly positioned within the first bore, the packing assembly having a sleeve that compresses a seal against at least a portion of the first bore to block fluid flow from the first bore, the sleeve extending along a sleeve length, wherein at least a first portion of the sleeve length is positioned within the first bore and at least a second portion of the sleeve length extends axially beyond the first bore, the second portion having a coupling component, and packing components positioned radially inward at least a portion of the sleeve. The fluid end also includes a cap coupled to the body, the cap overlapping the first portion of the sleeve.

BRIEF DESCRIPTION OF THE DRAWINGS

The present technology will be better understood on reading the following detailed description of non-limiting embodiments thereof, and on examining the accompanying drawings, in which:

FIGS. 7A-7C are isometric views of an embodiment of a sequence for removal of a sleeve, in accordance with embodiments of the present disclosure;

DETAILED DESCRIPTION

Figure 1:
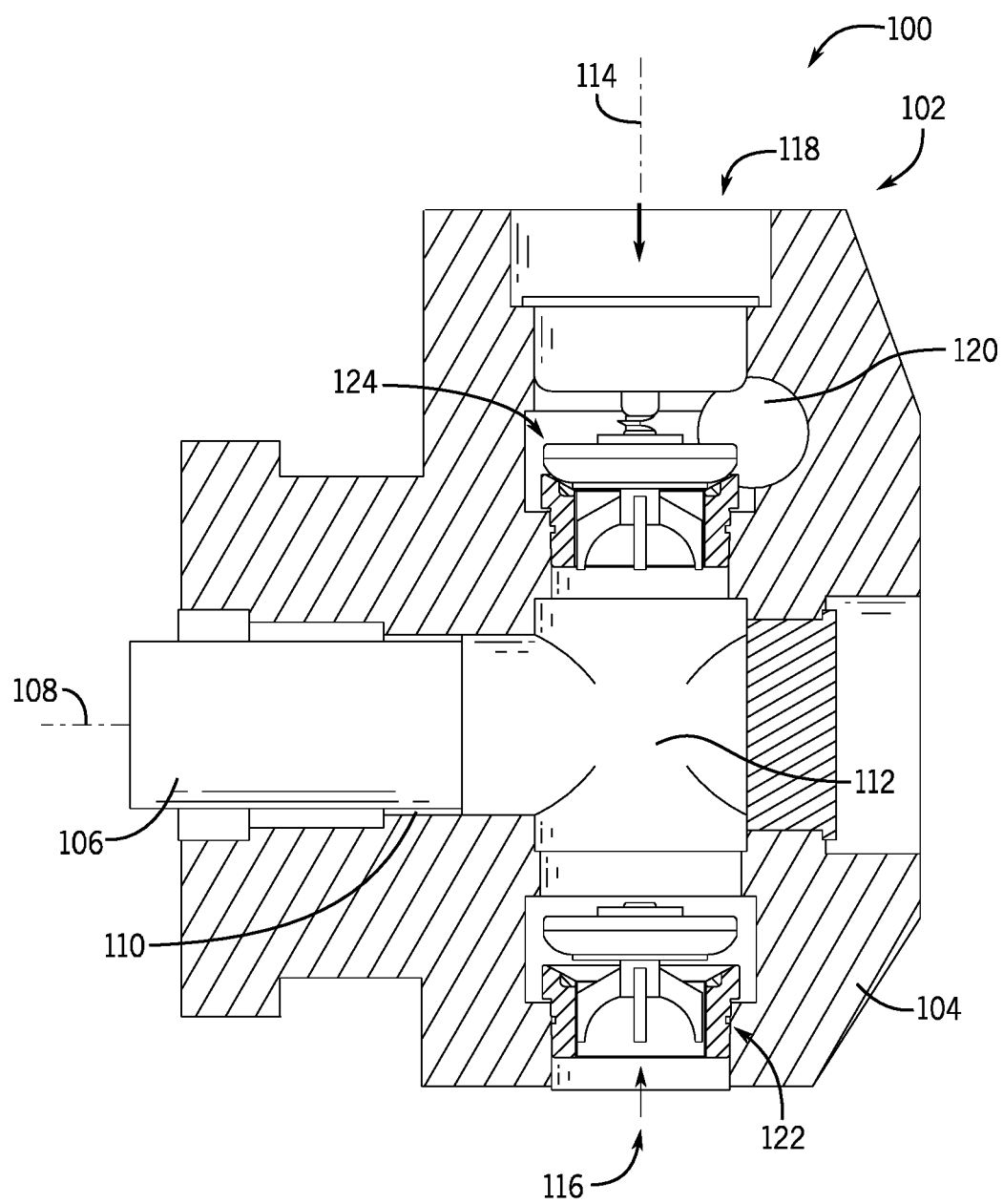
FIG. 1 is a schematic cross-sectional view of an embodiment of a pump assembly, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure are directed two one or more sealing systems for pumps, which may include reciprocating pumps. In at least one embodiment, one or more sealing systems may further be incorporated in various systems for pressure containment, and it should be appreciated that descriptions with respect to pumping systems or pumps is by way of example only and not intended to limit the scope of the present disclosure. Embodiments may be directed toward a sleeve (e.g., sleeve assembly, packing sleeve, insert, etc.) that includes external threads positioned for engagement by an installation/retrieval tool. In at least one embodiment, external threads are not engaged with other components of the pumping system during normal pumping operations. Accordingly, systems and methods may be directed toward a sleeve that interacts with an installation tool to facilitate rapid installation and removal of one or more components of a sealing system.

In at least one embodiment, systems and methods may be directed toward an installation tool that threadingly engages one or more sleeves, which may include mating threads as noted above. The installation tool may further be coupled to one or more pump pony rods via a clamp or other reasonable connection. In at least one embodiment, the installation tool may be used for rapid removal and installation of one or more sealing systems. By way of example only, a sleeve may be removed by threading or otherwise coupling a tool to the sleeve and engaging the tool to the pump, as noted above. Driving rotation of the pump crankshaft may facilitate removal of the sleeve. Thereafter, the sleeve may be threaded and a replacement may be coupled to the tool. Subsequent rotation of the crankshaft in an opposite direction may then be used to install the replacement sleeve.

In at least one embodiment, the sleeve may, at least in part secure a portion of packing or other sealing material within the a pump bore. For example, the seal may be positioned axially next to the packing and installation may compress the sleeve against the packing. In various embodiments, the sleeve may include one or more shelves to receive at least a portion of the packing material. In at least one embodiment, the sleeve may include an extension or arm to compress or otherwise engage packing material. In at least one embodiment, the sleeve may include combinations of elements to enable installation in a variety of different configurations. By way of example only, the sleeve may include a shelf, but the shelf may not be used in configurations where the sleeve is used to axially compress the packing. Moreover, the shelf may be used as the extension and not to receive the packing material.

FIG. 1 is a schematic cross-sectional view of an embodiment of a pump assembly 100, which may also be referred to as a reciprocating pump assembly and/or a reciprocating pump. The pump assembly 100 may be utilized during hydraulic fracturing operations, among other operations, where a working fluid (e.g., fracturing fluid, slurry, etc.) is introduced into the pump and energy is added to the working fluid to increase a pressure of the working fluid. Fracturing fluid, by way of example only, may include corrosives and also particulates, such as sand or ceramics, which are utilized during fracturing operations. These corrosives and particulates cause erosion within the pump assembly 100, which may undesirably affect fracturing operations and lead to down times to replace various components. Additionally, the fracturing fluids may include corrosive acids and the like, which may wear down components of the pump assembly 100.

It should be appreciated that various components of the pump assembly 100 have been removed for clarity with the following discussion. For example, a power end has been removed in favor of focusing on the illustrated fluid end 102 of the pump assembly 100. The power end may include a crankshaft that is driven by an engine or motor to facilitate operations. The fluid end 102 includes a fluid end block 104 that may house one or more components discussed herein. A plunger rod 106 is driven (e.g., via the crankshaft) to reciprocate within the fluid end block 104 along a plunger axis 108. The plunger rod 106 is positioned within a bore 110 extending through at least a portion of the fluid end block 104. The illustrated bore 110 is arranged along the plunger axis 108 (e.g., first axis) and intersects a pressure chamber 112, which is arranged along a pressure chamber axis 114 (e.g., second axis), which is positioned substantially perpendicular to the plunger axis 108. It should be appreciated that the pump assembly 100 may include multiple plunger rod and pressure chamber arrangements, which may be referred to as a plunger throw. For example, the pump assembly 100 may be a triplex pump, quadplex pump, quintuplex pump, and the like.

The illustrated fluid end block 104 includes an inlet passage 116 and an outlet chamber 118, which are generally coaxial and arranged along the pressure chamber axis 114. In other words, the inlet passage 116 and the outlet chamber 118 are axially aligned with respect to one another and/or the pressure chamber 112. In various embodiments, fluid enters the pressure chamber 112 via the inlet passage 116, for example on an up stroke of the plunger rod 106, and is driven out of the pressure chamber 112 an outlet passage 120, for example on a down stroke of the plunger 106.

Respective valve assemblies 122, 124 are arranged within the inlet passage 116 and the outlet chamber 118. These valve assemblies 122, 124 are spring loaded in the illustrated embodiment, but it should be appreciated that such an arrangement is for illustrative purposes only. In operation, a differential pressure may drive movement of the valve assemblies. For example, as the plunger rod 106 is on the upstroke, pressure at the inlet passage 116 may overcome the spring force of the valve assembly 122, thereby driving fluid into the pressure chamber 112. However, on the down stroke, the valve assembly 122 may be driven to a closed position, while the spring force of the valve assembly 124 is overcome, thereby enabling the fluid to exit via the outlet passage 120.

In one or more embodiments, a sealing element (not pictured) is arranged about the plunger rod 106 to block high pressure fluid from flow outside of the block 104. In at least one embodiment, one or more shoulders or groove may be formed within the block 104 to receive at least a portion of the sealing elements or components associated with the sealing elements. By way of example, one or more sealing elements may be positioned against a shoulder or groove within a bore and then compressed and/or axially maintained at a location by a sleeve that is secured to the block 104, such as by fasteners, threads, or the like. In at least one embodiment, installation and removal of the sleeve may be a challenging or time consuming process, and accordingly, systems and methods are directed toward sleeves and/or installation/removal tools to facilitate installation and removal of sealing elements.

Figure 2A:
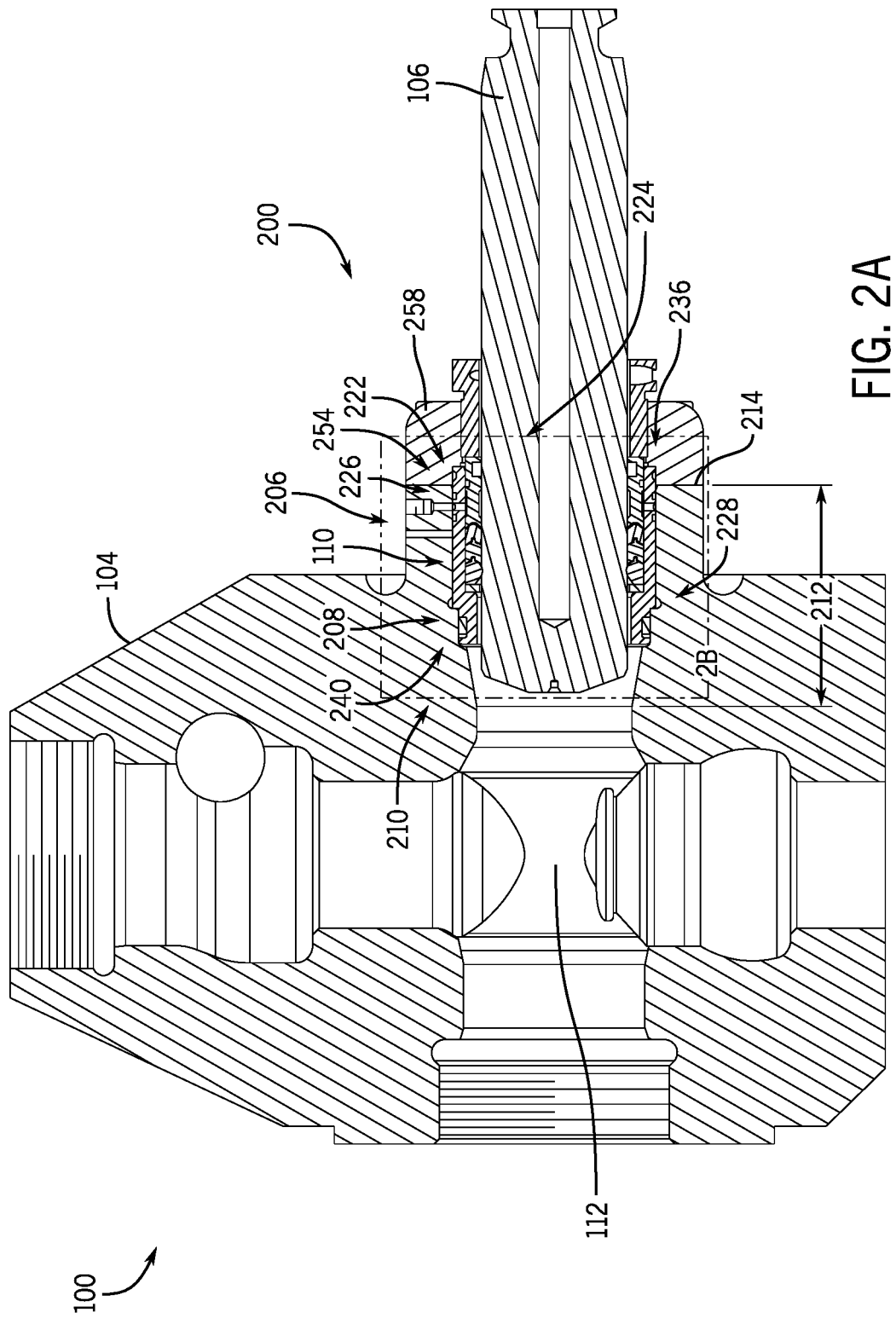
FIG. 2A is a schematic cross-sectional view of an embodiment of a pump assembly including a packing assembly, in accordance with embodiments of the present disclosure.
Figure 2B:
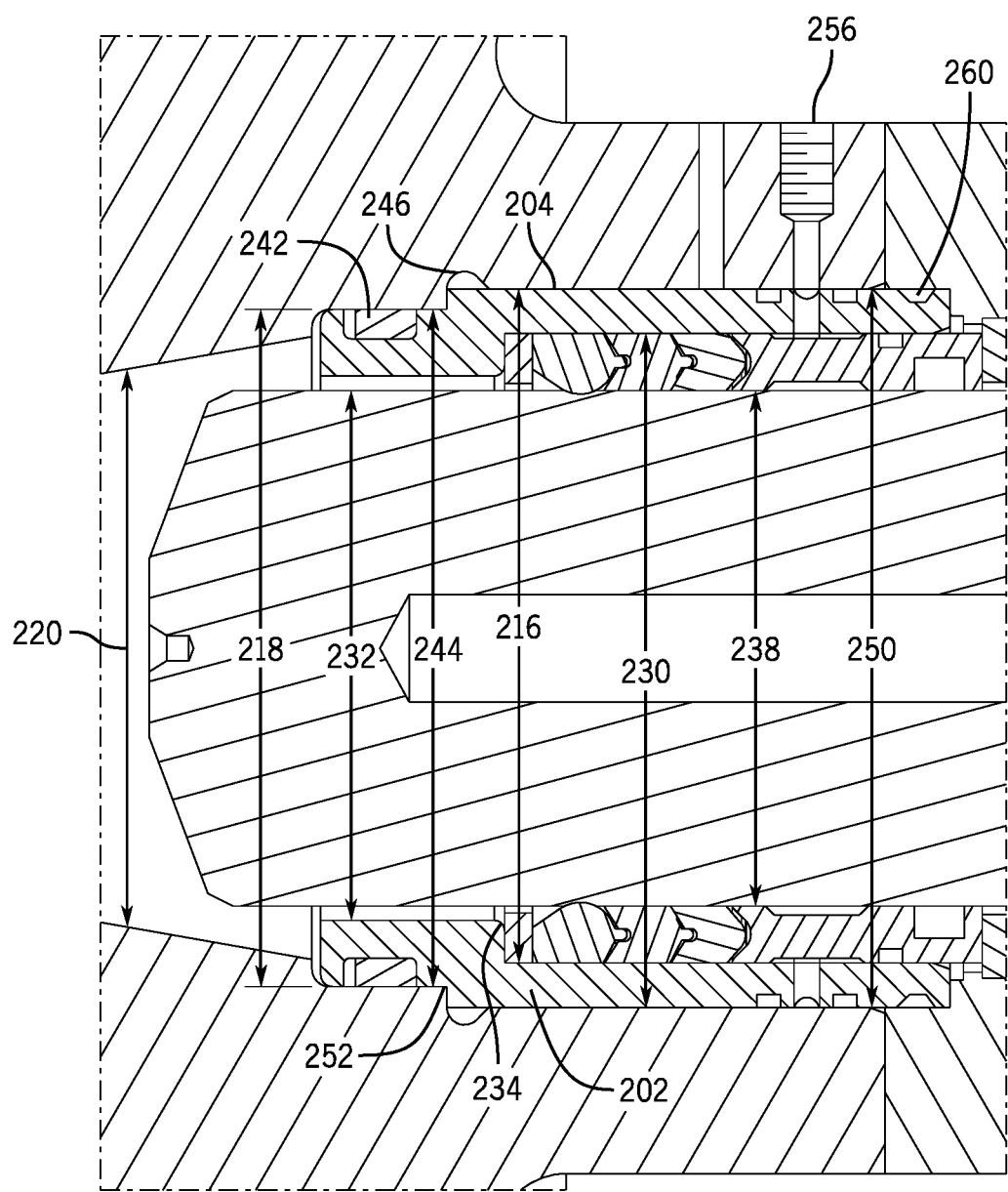
FIG. 2B is a detailed cross-sectional view of an embodiment of a pump assembly including a packing assembly, in accordance with embodiments of the present disclosure.

FIGS. 2A and 2B are cross-sectional views of the pump assembly 100 where the plunger rod 106 is illustrated within the bore 110. It should be appreciated that the configuration of various components of FIGS. 2A and 2B are by way of example only and are not intended to limit the scope of the present disclosure. As will be described herein, an illustrated sleeve may include a shelf in at least one embodiment, but the shelf may be omitted in other embodiments, as noted herein and further described below. The illustrated bore 110 includes a variable diameter including a stepped portion, which will be described herein, and receives a packing assembly 200, which includes a packing sleeve 202 (e.g., sleeve). The sleeve 202 forms a barrier between a wall 204 of the bore 110 and the plunger rod 106. As will be described below, during operation the sleeve 202 may be subjected to harsh operating conditions and erosion. It may be desirable to form the sleeve 202 as a sacrificial component for replacement over a lifetime of the pump assembly 100. For example, the sleeve 202 may be formed from a different material than the block 104 and/or from a material with altered/enhanced corrosion or erosion resistant properties.

The illustrated packing assembly 200 is positioned within the bore 110 that includes a first bore section 206, a second bore section 208, and a third bore section 210. It should be appreciated that the three sections 206, 208, 210 are shown for illustrative purposes and that in other embodiments more or fewer sections may be included. The illustrated bore 110 has a variable diameter across an axial length 212 extending from a face 214 toward the pressure chamber 112. In this configuration, a bore diameter decreases from the face 214 to the chamber 112. For example, the first bore section 206 has a first bore diameter 216, the second bore section 208 has a second bore diameter 218, and the third bore section 210 has a third bore diameter 220. The first bore diameter 216 is larger than both the second bore diameter 218 and the third bore diameter 220, while the second bore diameter 218 is also larger than the third bore diameter 220. The variable diameter bore may enable a shelf or shoulder to receive at least a portion of the sleeve 202, which may facilitate locating the sleeve 202 in a desired position and/or provide an indication to an operator for successful installation, among other benefits.

The sleeve 202 is a substantially cylindrical component having a body 222 with a bore 224 extending through the body 222. The bore 224 is a variable diameter bore 224 and the body 222 includes a first sleeve portion 226 and a second sleeve portion 228, each having a respective diameter 230, 232 (e.g., inner diameter). As noted above, and will be described herein, other embodiments may include a constant or substantially constant diameter bore 224 with both the first sleeve portion 226 and the second sleeve portion 228 having a common diameter 230, or in some embodiments, a common diameter 232. In this embodiment, the first sleeve portion diameter 230 is larger than the second sleeve portion diameter 232. As illustrated, the change in diameters forms a shelf 234 for receiving one or more packing components 236, such as seals, packing brass, and the like. In at least one embodiment, the shelf 234 is omitted, for example where the diameter is constant. With the inclusion of the packing components 236, a working diameter of the first sleeve portion is reduced, such that the packing component diameter 238 may be substantially equal to the second sleeve portion diameter 232. In operation, the plunger 106 reciprocates through the sleeve 202 such that the packing components 236 may contact the plunger 106.

As mentioned, in various embodiments the sleeve 202 is arranged within the bore 110 to provide a sacrificial component between the block 104 and the plunger 106. To prevent leaks and/or significantly reduce a likelihood of leaks, there may be seals and the like arranged between the sleeve 202 and the bore 110. In this embodiment, the sleeve 202 includes a groove 240 that receives seal 242 in the second sleeve portion 228. As shown, the groove 240 is formed in a second sleeve portion outer diameter 244. The seal 242 may be larger than the groove 240 (e.g., extend radially beyond the second sleeve portion outer diameter 244) such that the seal 242 is compressed against the bore 110 when the sleeve 202 is installed within the bore 110. In this matter, fluid may be blocked from entering the first bore section 206. It should be appreciated that, in alternative configurations, the groove 240 may be omitted and the seal 242 may be moved to act as a face seal that abuts an end of the sleeve 202, as will be described herein.

Moving toward the face 214, a transition 244 is illustrated at the variable diameter portion between the first sleeve portion 226 and the second sleeve portion 228. While the shelf 234 is formed along the inside, a shoulder 246 is illustrated where the outer diameter changes from the second sleeve portion outer diameter 244 to the first sleeve portion outer diameter 250. This shoulder 246 may engage an extension 252 between the first bore section 206 and the second bore section 208 representative of the change in diameter, which may help seat or otherwise position the sleeve 202 within the bore 110. In various embodiments, the shoulder 246 blocks axial movement of the sleeve 202 toward the pressure chamber 112. As noted above, this may enable operators to determine when the sleeve 202 has been positioned at a desired location. The illustrated embodiment includes the shoulder 246 have a substantially right angle, however, it should be appreciated that the shoulder 246 may be tapered or at a less smaller angle (e.g., between 0 degrees and 90 degrees). Furthermore, in one or more embodiments, the extension 252 may receive a face seal or other seal that is compressed by the sleeve 202, for example in configurations where the transition 244 is omitted.

It should be appreciated that various additional seals may also be utilized with the illustrated sleeve 202. For example, in the illustrated embodiment, additional seal arrangements 254 are arranged surrounding a grease portion 256 and also at an interface with a cap 258. Accordingly, potential leak paths may be blocked by forming respective grooves that receive seals along various different portions of the sleeve 202.

In various embodiments, sleeve 202 may further included threads or coupling components 260, as illustrated in FIGS. 2A and 2B. In this example, the coupling components 260 extend beyond the face 214, and in this case are positioned within the cap 258. In other words, the coupling components 260 may be positioned to not engage the block 104 and/or the bore 110, but rather, to engage components external to the bore 110. As noted herein, in various embodiments the external components may correspond to one or more installation/removal tools that may engage the sleeve 202 for efficient removal, for example using internal threads of the tool to engage the coupling components 260 of the sleeve 202. It should be appreciated that threads are provided as an example for the coupling components 260, and in various other embodiments, additional fasteners may also be utilized such as tongue and groove fittings, bayonet style connectors, pegs and dowels, glues/adhesives, and the like.

Figure 3A:
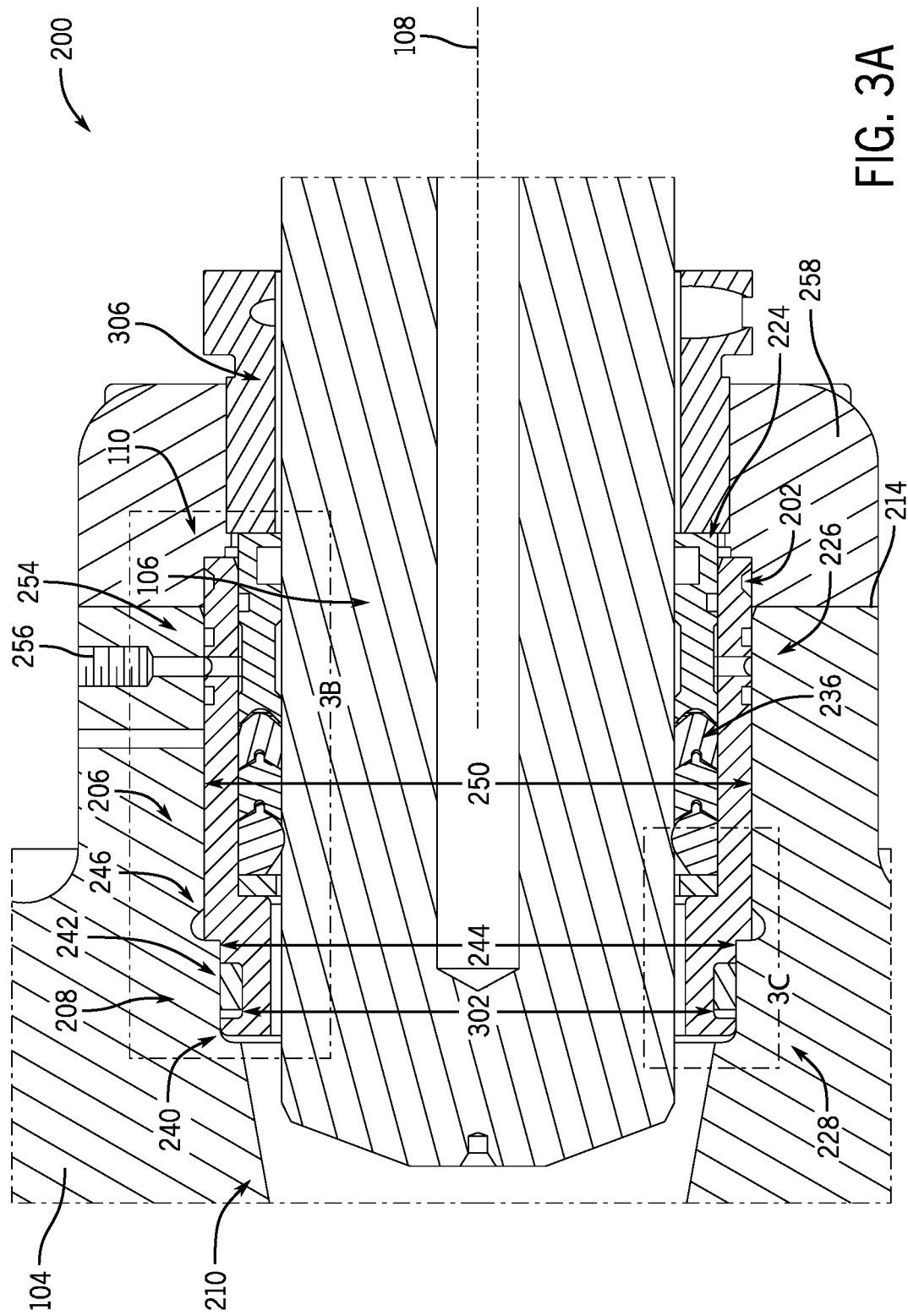
FIG. 3A is a schematic cross-sectional view of an embodiment of a packing assembly, in accordance with embodiments of the present disclosure.
Figure 3B:
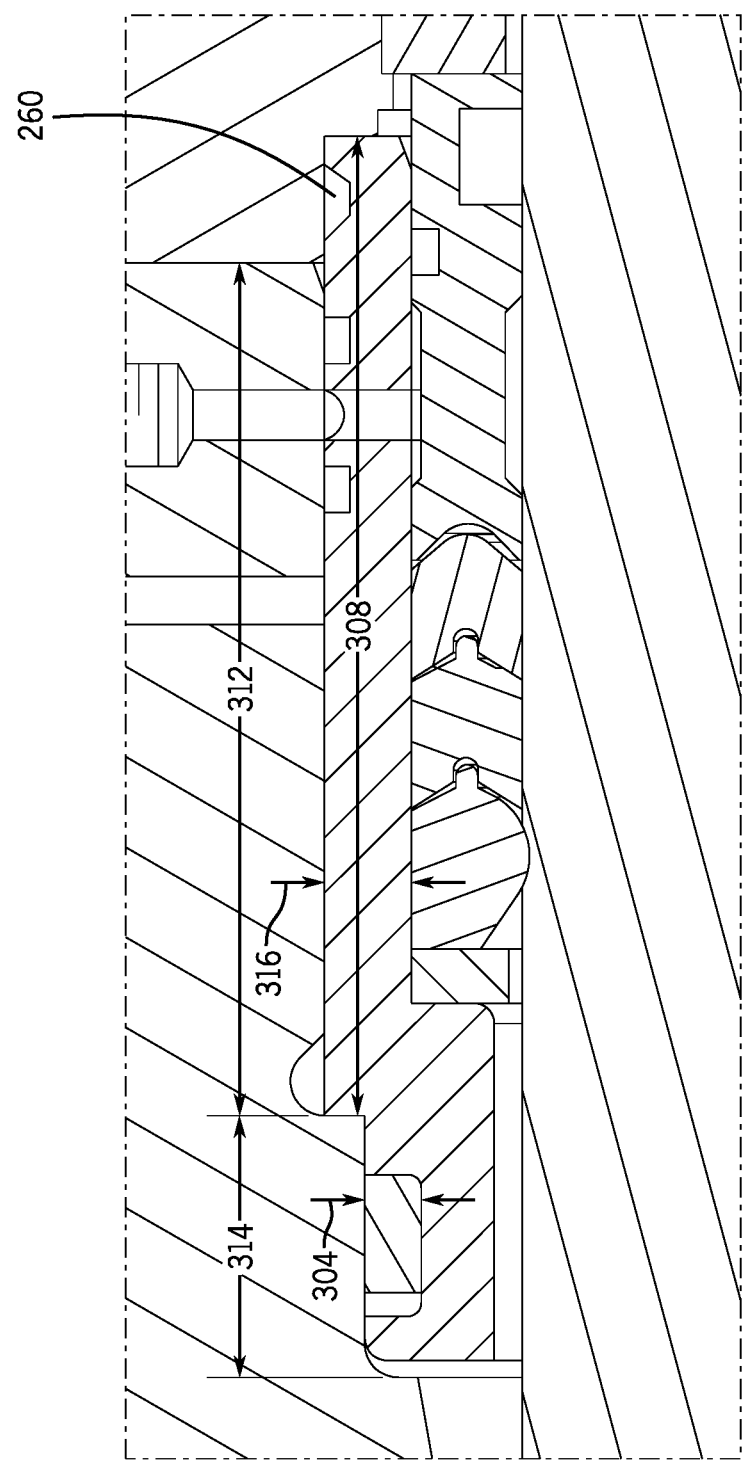
FIG. 3B is a detailed cross-sectional view of an embodiment of a packing assembly, in accordance with embodiments of the present disclosure.
Figure 3C:
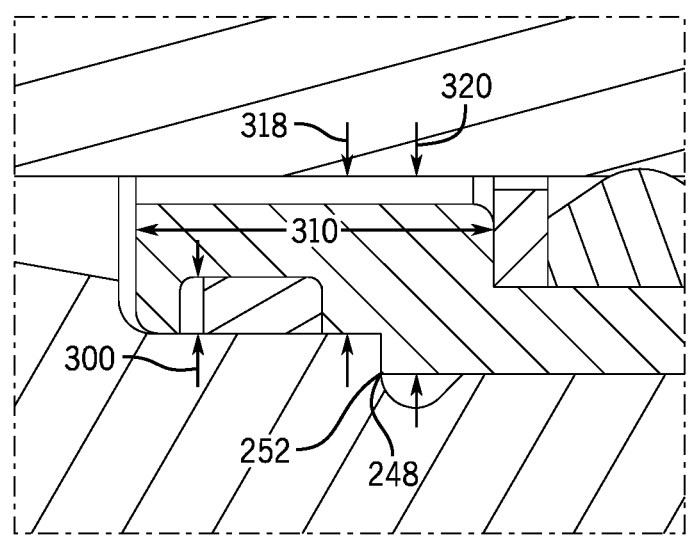
FIG. 3C is a detailed cross-sectional view of an embodiment of a packing assembly, in accordance with embodiments of the present disclosure.

FIGS. 3A-3C are detailed cross-sectional views of the packing assembly 200 illustrating the sleeve 202 arranged within the bore 110 with the seal 242 positioned within the groove 240 to bear against the block 104 at the second bore section 208. In other words, the groove 240 and the seal 242 are positioned at the reduced diameter portion of the sleeve 202 corresponding to the second sleeve portion 228. As noted above, the embodiments shown in FIGS. 3A-3C are for illustrative purposes and, in various embodiments, the groove 240, as well as the transition 246, may be omitted in favor of a substantially constant diameter sleeve 202 that compresses the seal 242 against the fluid end block 104.

As described above, the sleeve 202 extends into the bore 110 such that at least a portion of the second sleeve portion 228 is positioned within at least a portion of the second bore section 208. Further axial movement of the sleeve 202 toward the third bore section 210 may be blocked via engagement between the shoulder 248 and the extension 252. That is, incorporating variable diameter portions of both the bore 110 and the sleeve 202 may enable operators to quickly and efficiently install components because alignment may be indicated to the operator via contact between components. It should be appreciated that the location of the extension 252 being internal to the block 104 (e.g., within the bore sections) is for illustrative purpose and that, in some instances, the extension 252 may be on the outside of the block 104.

The groove 240 is formed within the second sleeve portion 228 and extends a groove depth 300 toward the axis 108 such that a groove diameter 302 is less than a second sleeve portion outer diameter 244. While the illustrated groove 240 is substantially square or rectangular (e.g., parallel sidewalls with a substantially perpendicular base), it should be appreciated that this arrangement is for illustrative purposes only and that, in other embodiments, the groove 240 may have arcuate sidewalls, slanted sidewalls, a single slanted sidewall, or any other reasonable combination. Furthermore, in one or more embodiments, the groove 240 may be omitted. In various embodiments, a seal thickness 304 may be greater than the groove depth 300, such that the seal 242 extends radially outward from the groove 240. As will be appreciated, when installed, the seal 242 may be compressed via contact with the end block 104, which may cause the seal 242 to expand or otherwise fill different portions of the groove 240. In various embodiments, the seal 242 is formed from a polymer material, but it should be appreciated that any reasonable material, such as metals, elastomers, synthetics, or combinations thereof may be utilized for the seal 242. Furthermore, while a single seal 242 is illustrated, multiple seals may be positioned within the groove 240 or multiple grooves 240.

The second sleeve portion outer diameter 244 is less than the first sleeve portion outer diameter 250, as noted above, thereby forming the transition 246 and the shoulder 248. It should be appreciated that the respective sizes of the diameters 244, 250 may be particularly selected based on expected operating conditions. For example, the diameters 244, 250 may be selected for strength, pressure containing purposes, longevity, weight, or the like. As noted, in one or more embodiments the transition 246 and the shoulder 248 may be omitted in favor of a substantially constant outer diameter for the sleeve 202.

The packing components 236 are illustrated within the sleeve bore 224 and bear against the plunger 106. In this embodiment, the packing components 236 include seals, packing brass, and the like. A packing nut 306 secures the packing components 236 within the sleeve bore 224, for example, via coupling to the block 104. Accordingly, operation of the pump is enabled as the plunger 106 reciprocates through the bore 110. It should be appreciated that, in other embodiments, the packing components may not rest on the sleeve 202 or portions thereof and spacer rings, or other sealing elements, may be arranged within the bore 110 to receive the packing components.

As noted above, additional sealing arrangements 254 are positioned along the sleeve 202, for example around the grease port 256 and/or proximate the cap 258. As a result, various levels of leak protection are provided, which may reduce the time between maintenance activities. In at least one embodiment, the additional sealing components may extend toward the cap 258 and stop at the coupling components 260. For example, the coupling components may be utilized to couple to one or more installation and removal tools utilized during one or more maintenance operations. In at least one embodiment, as noted above, the coupling components 260 are positioned to extend axially out of the bore 110 and portions may be at least partially overlapped by the cap 258.

It should be appreciated that various components of the sleeve 202 may be particularly selected based on operating conditions. For example, a first sleeve portion length 308 is illustrated as being larger than a second sleeve portion length 310 and larger than a first bore section length 312. That is, in this embodiment, the first sleeve portion 226 extends outwardly from the face 214. Furthermore, in this configuration, the second sleeve portion length 310 substantially corresponds to a second bore section length 314. Additionally, due to the variable diameter portions of the sleeve 202, different portions may have different thicknesses, which may be selected based on the dimensions of associated components. For example, a first sleeve portion thickness 316 is less than a second sleeve portion thickness 318, which is also less than a transition thickness 320 due to the overlap of the first and second sleeve portions 226, 228, at the transition 246. In various embodiments, relative thicknesses may be substantially constant along the length of the sleeve 202.

Figure 4:
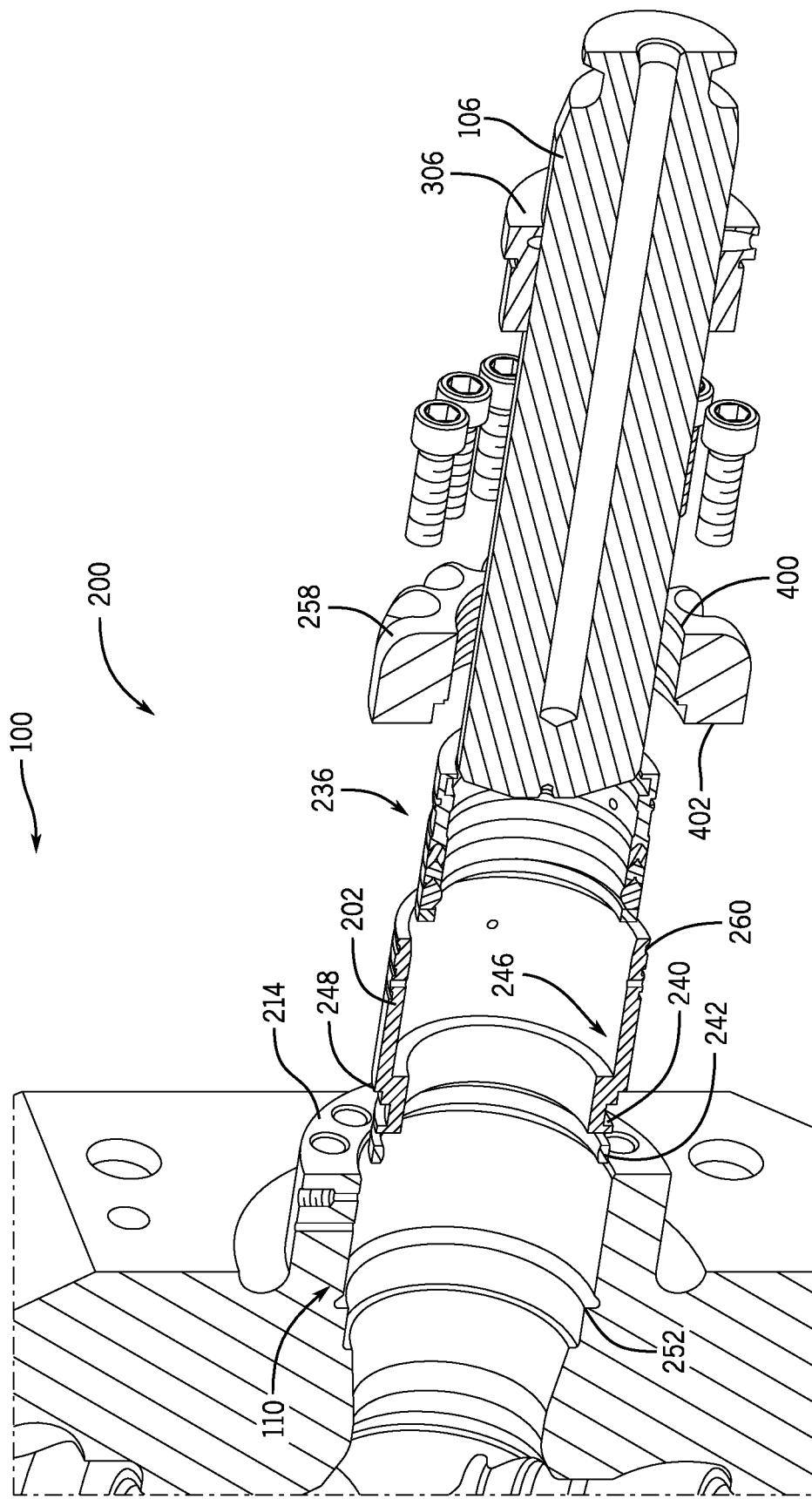
FIG. 4 is an exploded cross-sectional view of an embodiment of a pump assembly, in accordance with embodiments of the present disclosure.

FIG. 4 is an exploded cross-sectional view of the pump assembly 100 including the packing assembly 200. As shown, the illustrated packing assembly 200 is positioned proximate the face 214 and bore 110. The seal 242 is positioned out of the groove 240, formed lower (e.g., closer to the face) than the transition 246. Furthermore, the packing components 236 and plunger 106 are also installed within the bore, through the sleeve 202. The packing components 236 are secured in place via the packing nut 306.

In operation, the seal 242 may be arranged within the groove 240 and then the sleeve 202 may be installed until the shoulder 248 contacts the extension 252. In embodiments, coatings or the like may be used to prepare various surfaces. Thereafter, the packing components 236 may be installed, but it should be appreciated that the packing components 236 may also be installed prior to installation of the sleeve 202. As noted herein, in various embodiments the groove 240 is omitted and the seal 242 may be positioned within the bore 110, for example on a shelf or spacer ring, and then compressed by the sleeve 202.

Further illustrated is the coupling component 260, which may include threads to facilitate coupling to an installation tool for assembly and/or removal. In this example, the coupling component 260 is positioned at an end of the sleeve 202 extending axially away from the bore 110. In operation, the coupling component 260 may align with the cap 258, which in this example is illustrated with a threaded portion 400 over a portion of the cap 258 and a non-threaded portion 402 over another portion of the cap 258. In various embodiments, the non-threaded portion 402 may align with the coupling component 260, such that the coupling component 260 is disengaged and/or not coupled to another component during operation. However, the coupling component 260 may be utilized during installation and removal operations. Moreover, in one or more embodiments, the cap 258 may be used to protect or otherwise guard the coupling component 260. In should be appreciated that, in one or more embodiments, the coupling component 260 may also be configured to couple to the cap 258.

Figure 5:
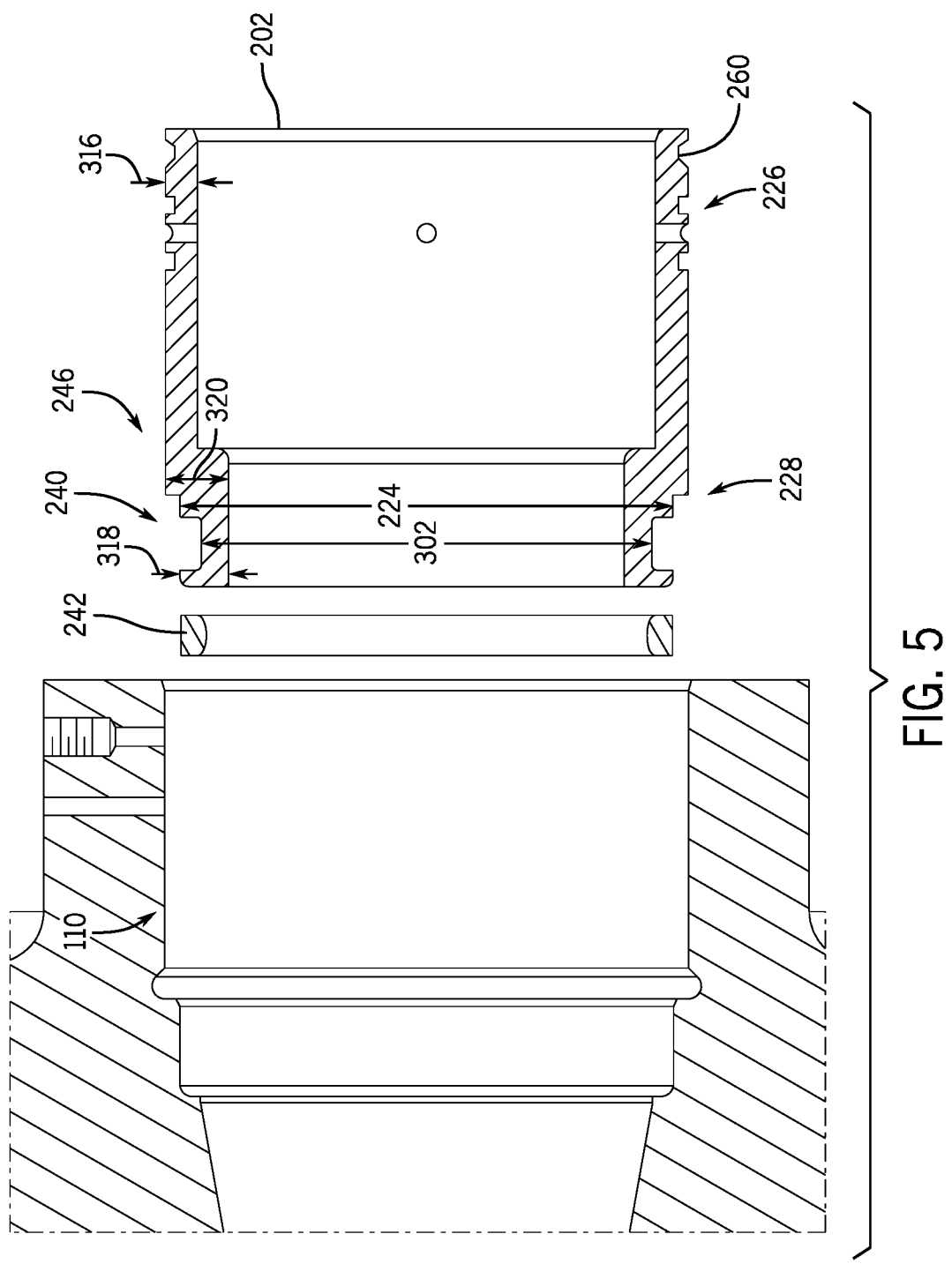
FIG. 5 is a cross-sectional view of an embodiment of a sleeve, in accordance with embodiments of the present disclosure.

FIG. 5 is a cross-sectional view of the sleeve 202 and the seal 242 positioned proximate the bore 110. As discussed, the groove 240 is formed within the second sleeve portion 228 and has a groove diameter 302 that is less than the second sleeve portion outer diameter 244. The illustrated seal 242 is sized to fit within the groove 240 and for installation into the bore 110. However, as noted herein, other embodiments may omit the groove 240 and position the seal 242 at different locations, such as directly into bore 110 axially closer than sleeve 202. Further illustrated is the transition 246 and the increased transition thickness 320 compared to the first sleeve portion thickness 316 and the second sleeve portion thickness 318. As noted above, these dimensions may be particularly selected based on anticipated operating conditions. By way of example, it may be desirable for the second sleeve portion 228 to be thicker than the first sleeve portion 226 because the second sleeve portion 226 is closer to the pressure chamber 112 and may experience more exposure to the fluids.

FIGS. 6A-6F illustrate an installation and removal sequence 600 in which the coupling component 260 is utilized for removal and/or installation of one or more sleeves 202. In this sequence 600, an installation/removal tool 602 (e.g., tool, installation and removal tool, etc.) is utilized to engage sleeves 202, for example via coupling components 260, for removal and/or installation. In one or more embodiments, installation/removal tool 602 may be coupled to one or more components of the pump assembly 100 to facilitate removal, such as via rotational of the pump assembly crankshaft in a forward direction for installation and rotation in a backward direction for removal.

Figure 6A:
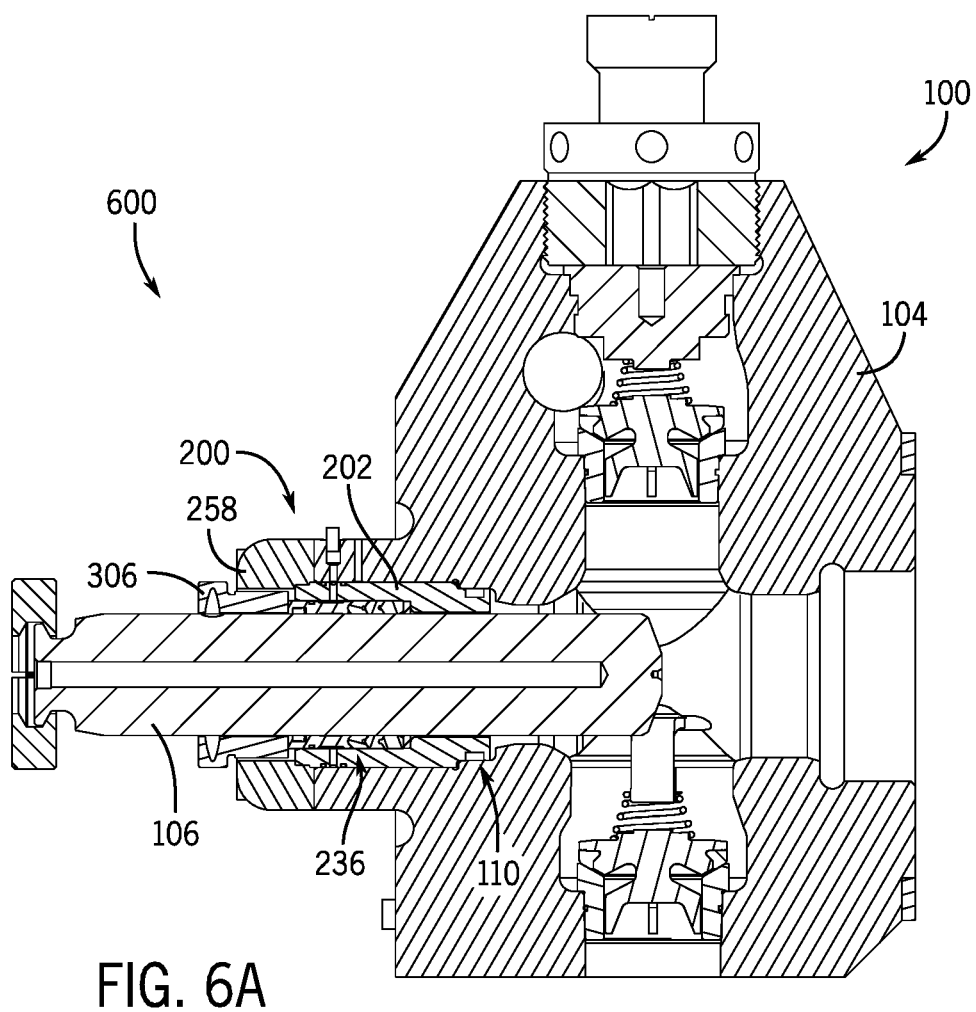
FIGS. 6A-6F are cross-sectional views of an embodiment of a sequence for removal of a sleeve, in accordance with embodiments of the present disclosure.
Figure 6B:
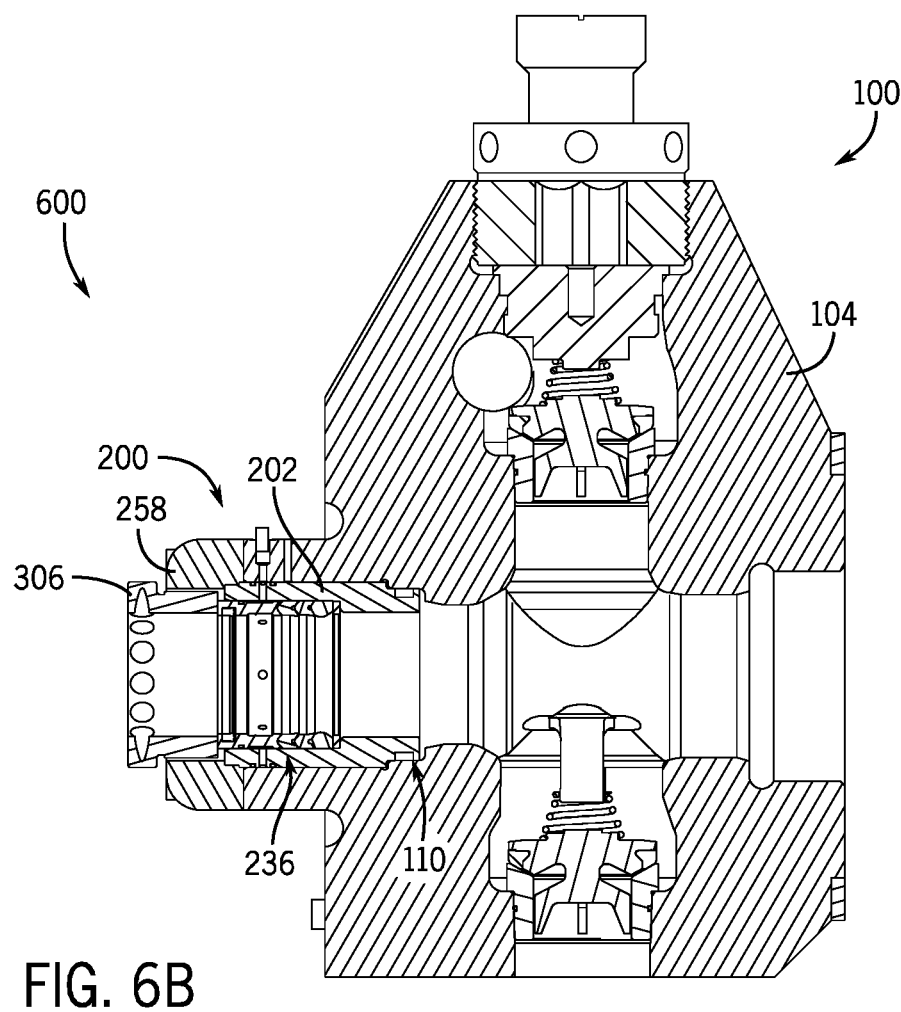
Figure 6C:
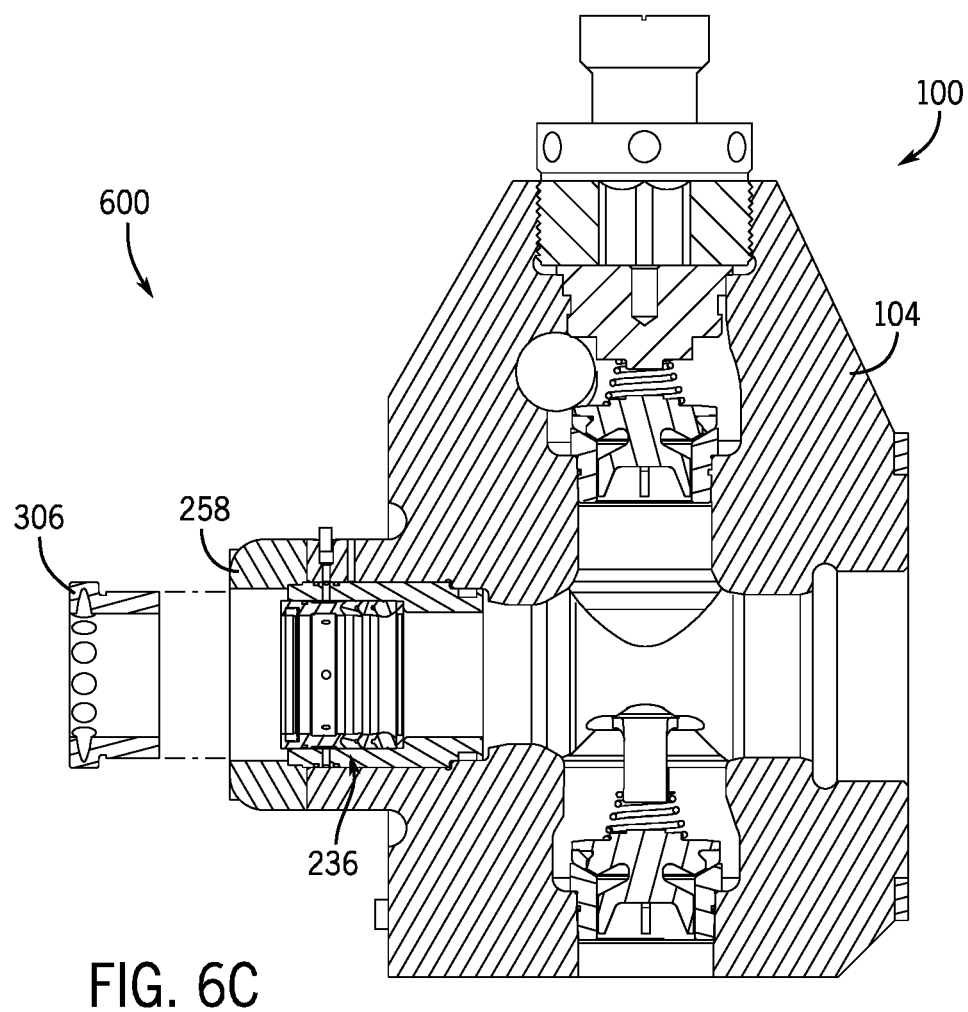

FIG. 6A illustrates the pump assembly 100 including the packing assembly 200 having the sleeve 202 as described above. As noted, other embodiments may omit or change various components, but it should be appreciated that one or more steps of the removal and/or installation procedures may be similar. In at least one embodiment, it is determined that removal of the packing assembly 200 is desired, for example to replace the packing components 236, to inspect the sleeve 202 for damage, or the like. FIG. 6B further illustrates the pump assembly 100 after the rod 106 is removed from the bore 110. In this example, the packing nut 306 and cap 258 remain coupled to the block 104, and moreover, the packing components 236 are still positioned within the bore 110. FIG. 6C illustrates removal of the packing nut 306, which permits removal of the packing components 236, among other elements. In this example, the packing nut 306 may be threaded into the cap 258 such that removal utilizes unthreading the packing nut 306 from the cap 258 while the cap 258 remains engaged with the block 104, for example via one or more fasteners coupling the cap 258 to the block 104.

Figure 6D:
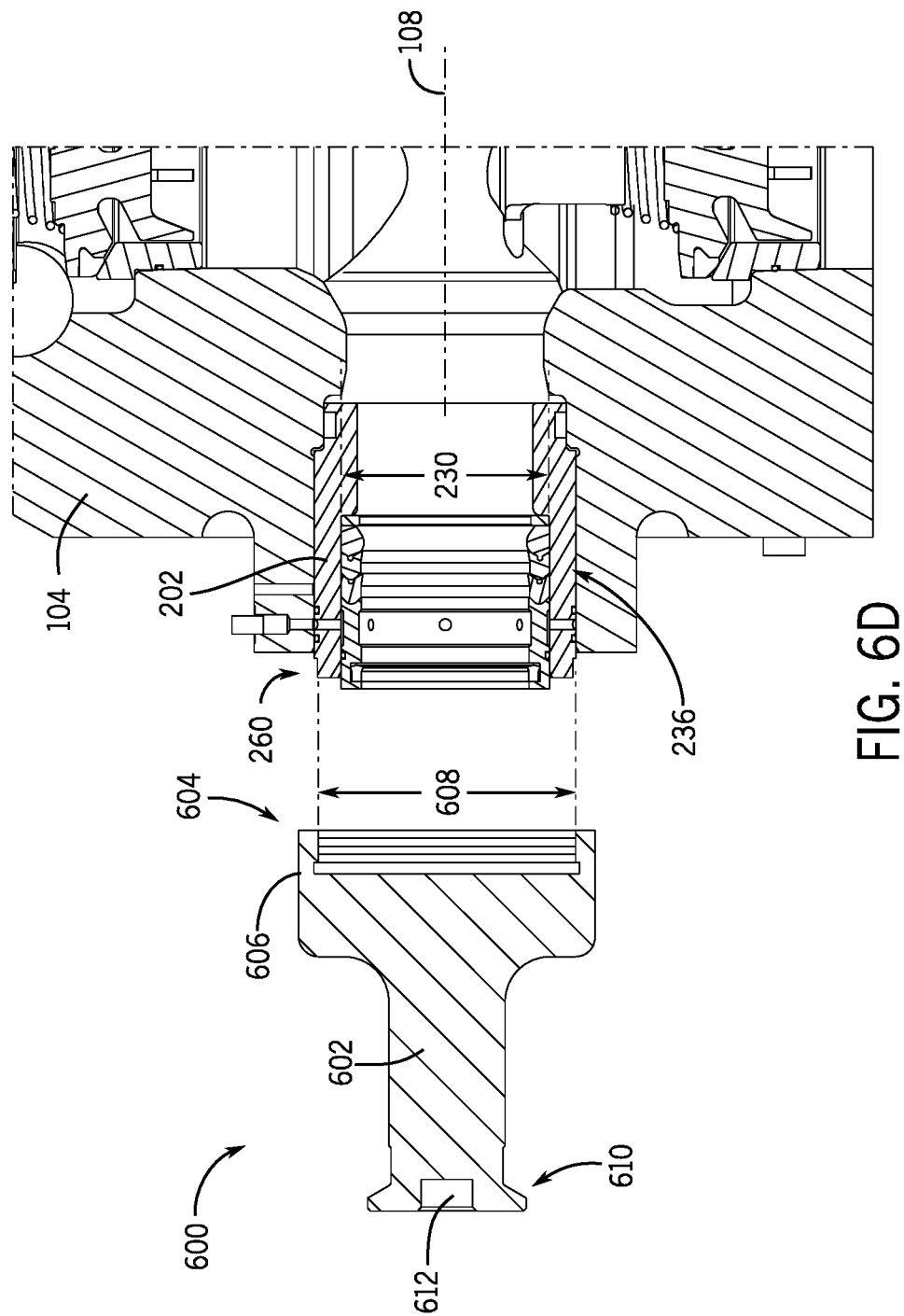

Further illustrated in FIG. 6D is the installation/removal tool 602 positioned proximate the block 104. In this example, the tool 602 is axially aligned with the axis 108 such that an engaging end 604 is aligned with the sleeve 202. In one or more embodiments, the engaging end 604 includes mating coupling components 606, which in this example are threads to engage the coupling components 260 of the sleeve 202. As shown, an engaging end diameter 608 is greater than the first sleeve portion diameter 230 to facilitate engagement with the coupling components 260, instead of the packing components 236. In at least one embodiment, the tool 602 further includes a working end 610, opposite the engaging end 604, which includes one or more fittings 612 to facilitate coupling to external drivers, such as the pump assembly 100, hand tools, etc. to drive rotation of the tool 602.

Figure 6E:
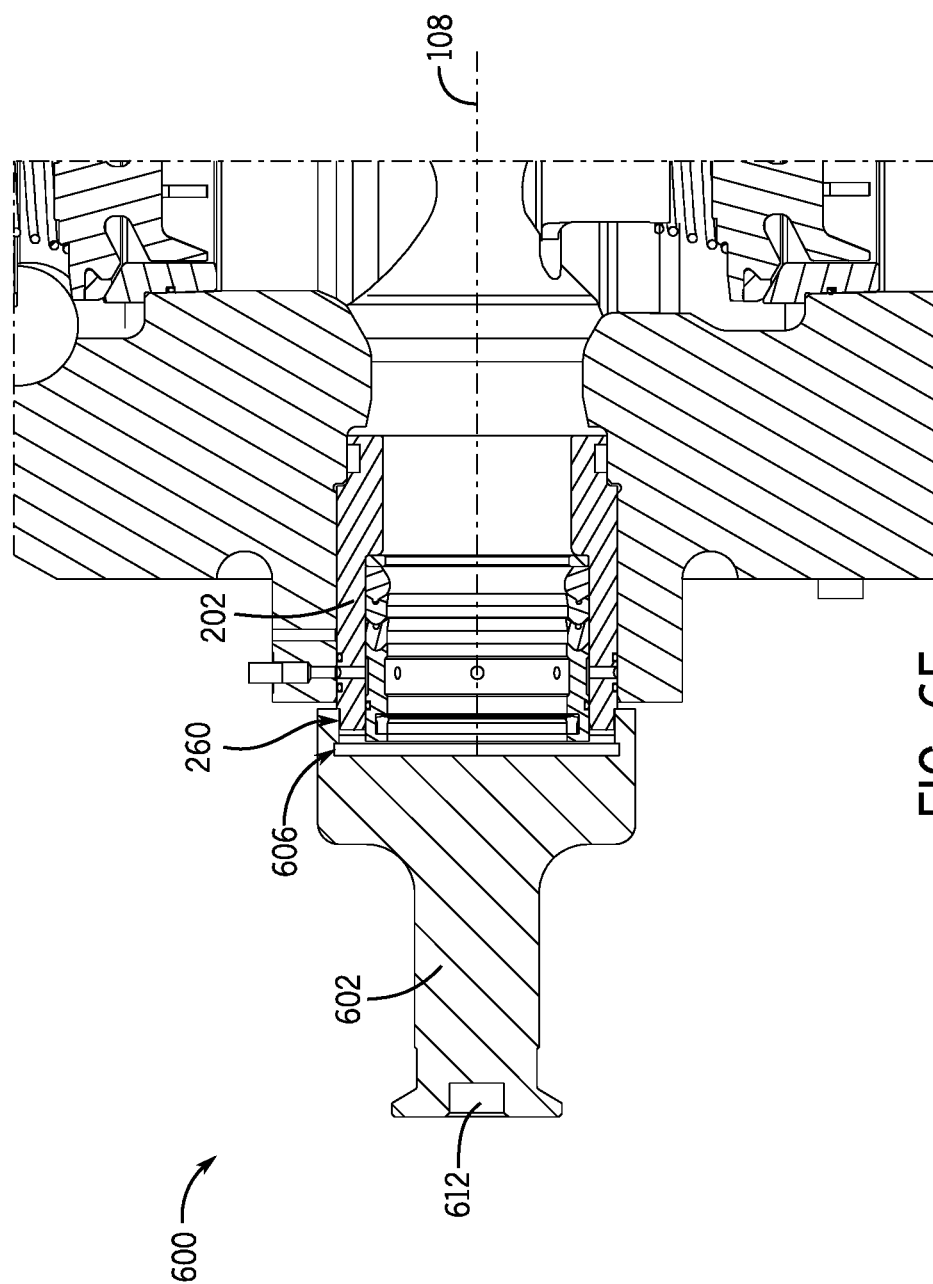
Figure 6F:
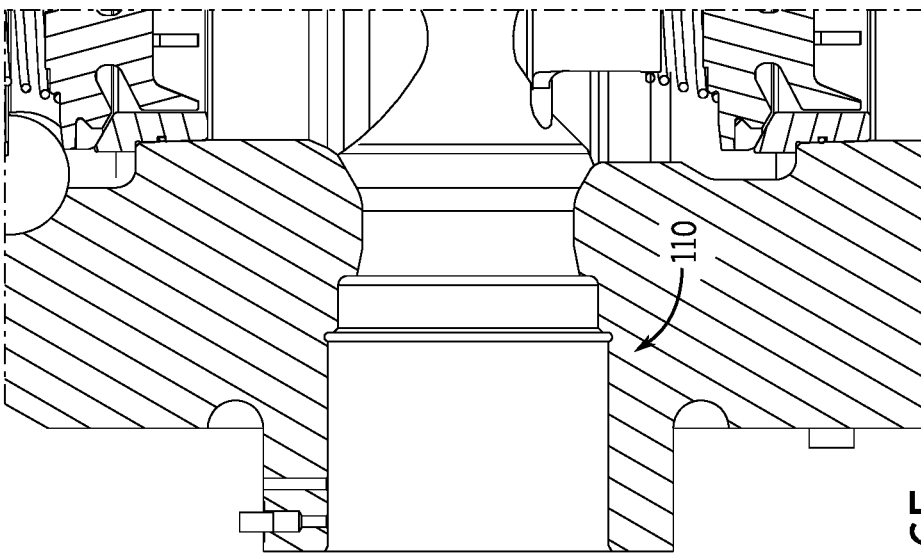
Figure 6F:
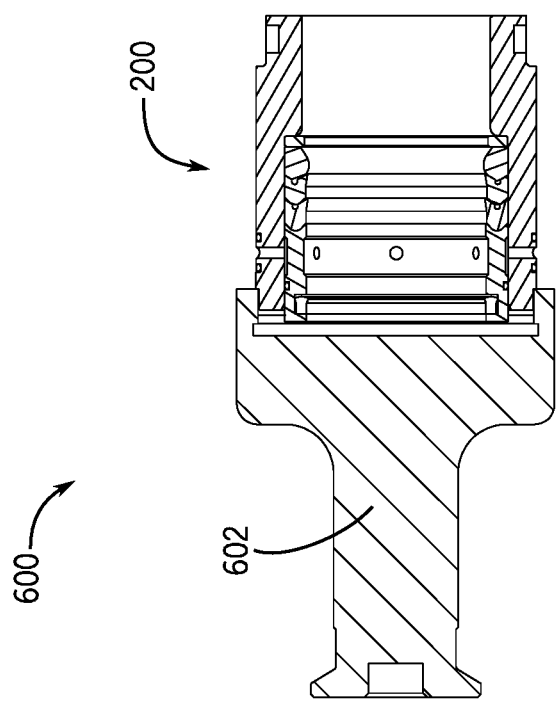

FIG. 6E illustrates engagement between the tool 602 and the sleeve 202 via the components 260, 606. For example, in embodiments where the components 260, 606 are threads, engagement may be facilitated by rotating the tool 602 about the axis 108, which in certain embodiments may be performed via coupling of the tool 602 to the pump assembly 100 and rotating the crankshaft. In various embodiments, one or more hand tools may be used to engage the fitting 612 to drive rotation. FIG. 6F illustrates axial removal of the packing assembly 200 from the bore 110. In this example, the entire assembly 200 may be removed, which may be an improvement over removing individual components from the bore 110 to facilitate faster installation and removal. Accordingly, a new assembly may be installed, which may have a similar configuration as the removed assembly or may have a different configuration, such as a constant diameter sleeve as described herein.

Figure 7B:
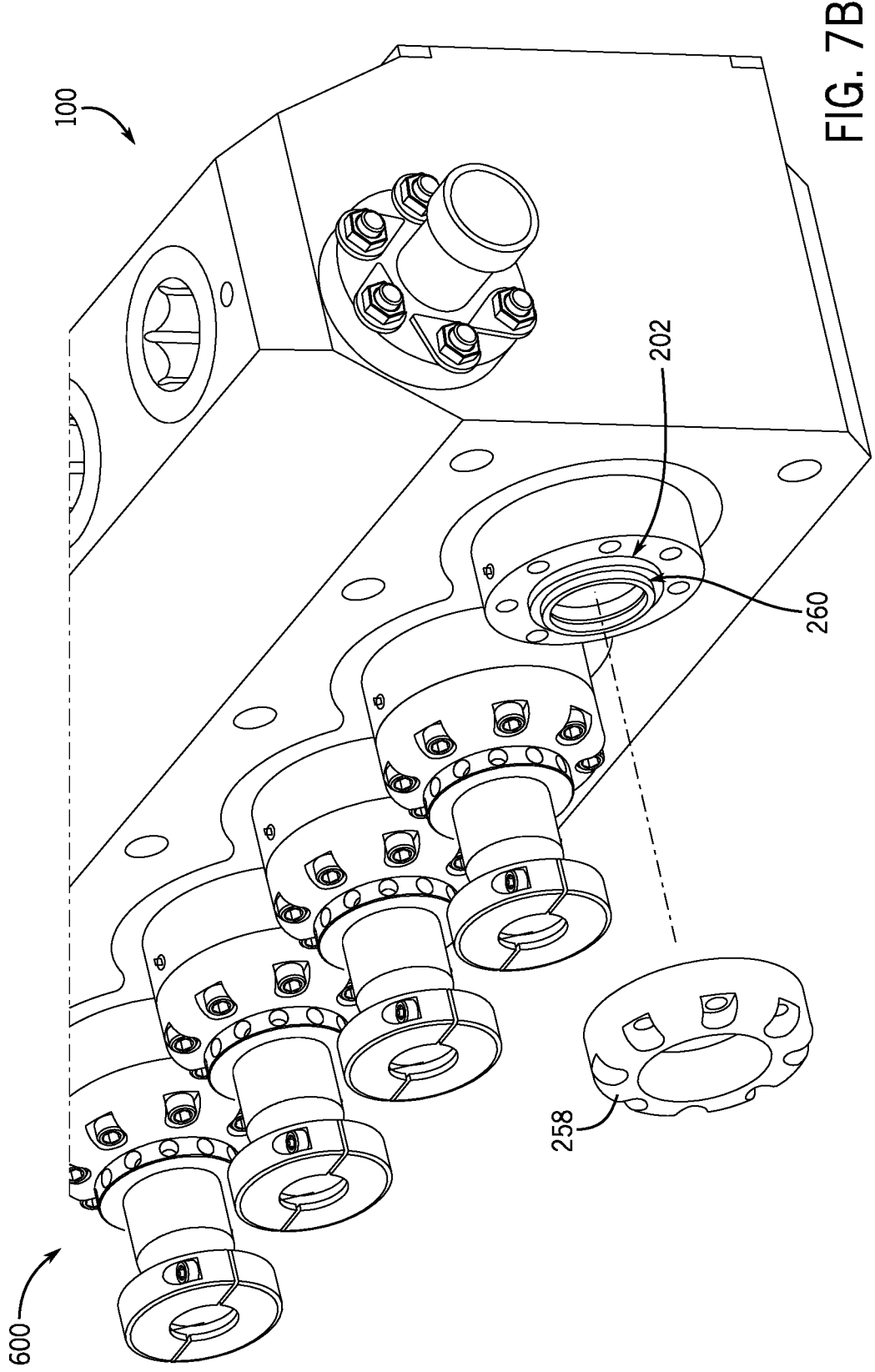
Figure 7C:
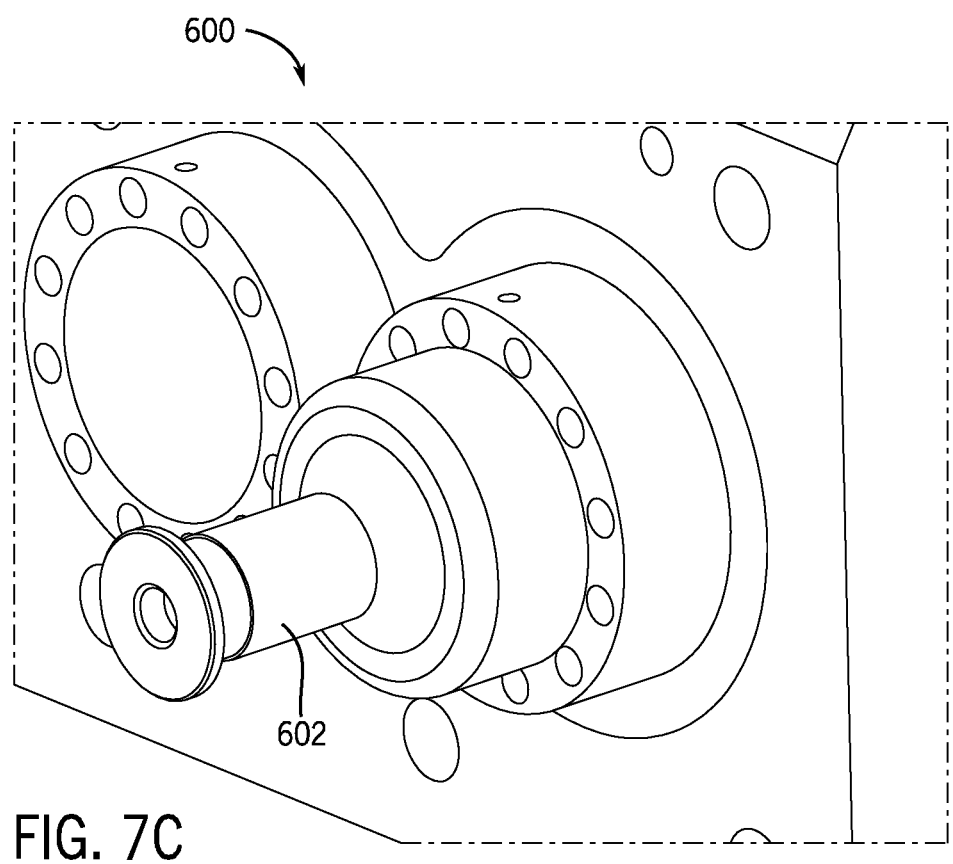

FIGS. 7A-7C are perspective views of embodiments of the pump assembly 100 illustrating different portions of the removal sequence 600, including removal of the plunger 106 and packing nut 306 (FIG. 7A), removal of the cap 258 (FIG. 7B), and installation of the tool 602 (FIG. 7C). In these examples, various interactions between components may be seen. By way of example, FIG. 7A illustrates threads for installing the packing nut 306 within the cap 258. Furthermore, fasteners secure the cap 258 to the block 104. FIG. 7B further illustrates removal of the cap 258 to expose the coupling components 260 of the sleeve 202, which in various embodiments do not engage the cap 258 and are utilized for installation and removal, for example via a tool (not pictured in FIG. 7B). However, FIG. 7C illustrates coupling of the tool 602 to the coupling components 260, for example via mating threads, to facilitate removal of the assembly (not visible). In various embodiments, it should be appreciated that the tool 602 may further be coupled to one or more components to facilitate rotation, but this has been omitted for clarity with the figures.

Figure 8:
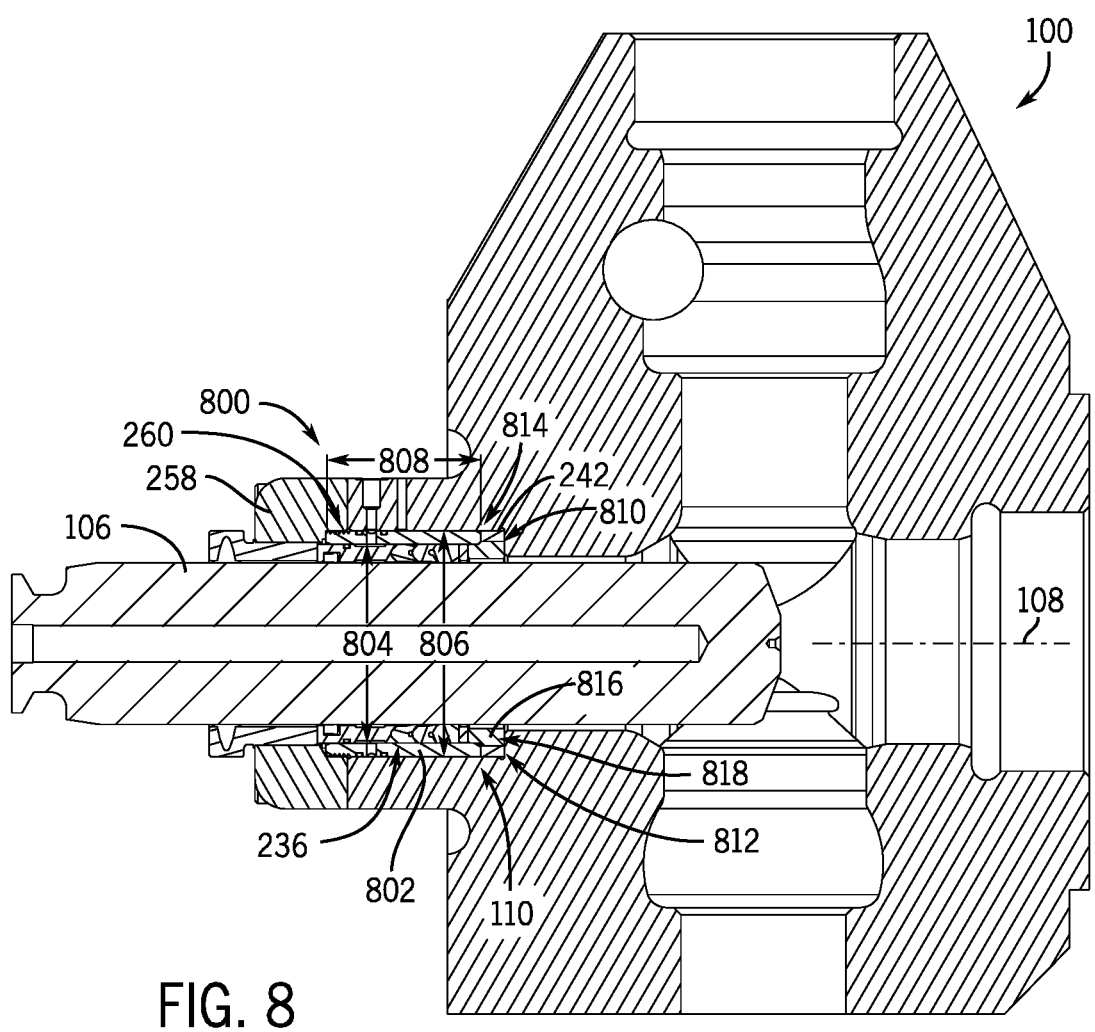
FIG. 8 is a schematic cross-sectional view of an embodiment of a pump assembly including a packing assembly, in accordance with embodiments of the present disclosure.

FIG. 8 is a cross-sectional view of an embodiment of a pump assembly 100 including a packing assembly 800, which may share one or more features with the packing assembly 200, and it should be appreciated that certain components may share reference numerals for convenience, and such numbering should not be construed as a limitation in configurations utilized with the present disclosure. In this example, the packing assembly 800 includes a sleeve 802, which may share or more features with the sleeve 202, as noted above. In one or more embodiments, the sleeve 802 extends, at least partially, into the bore 110. The sleeve 802 is substantially aligned along the axis 108 and arranged coaxially within the bore 110. The sleeve 802 is positioned radially outward from the rod 106 and packing components 236 are positioned to bear against both the sleeve 802 and the rod 106.

In this example, the sleeve 802 has a substantially constant inner diameter 804 and a substantially constant outer diameter 806. It should be appreciated that substantially constant refers to a majority percentage of a sleeve length 808 having an approximately equal diameter. In this example, the sleeve 802 is utilized to compress the seal 242 against an inner face 810. In various embodiments, the inner face 810 is formed, at least in part, on a shelf 812 formed by a transition between diameters within the bore 110, as also described above. The illustrated seal 242 is positioned at a radially outward portion 814 of the shelf 812 and is substantially aligned with the sleeve 802. In operation, the sleeve 802 may be utilized to compress the seal 242 to block fluid leaks around the rod 106.

In one or more embodiments, a ring 816 is also positioned along the shelf 812, and in this example is positioned at a radially inward portion 818. That is, the ring 816 is arranged between the seal 242 and the rod 106. It should be appreciated that this configuration is for illustrative purposes only and that, in one or more embodiments, at least a portion of the seal may be aligned with the ring 816, may be radially inward of the ring 816, or may be in any other reasonable location. In various embodiments, at least a portion of the ring 816 is utilized to support the packing components 236, as will be described below.

Further illustrated in FIG. 8 is are the coupling components 260, which as shown as threads. In this example, the coupling components 260 extend axially out of the bore 110 and are overlapped, at least partially, by the cap 258. In one or more embodiments, the coupling components 260 are not engaged during normal operation of the pump assembly 100 (e.g., not engaged while the pump assembly is running) and are utilized for installation and removal of the packing assembly 900.

Figure 9A:
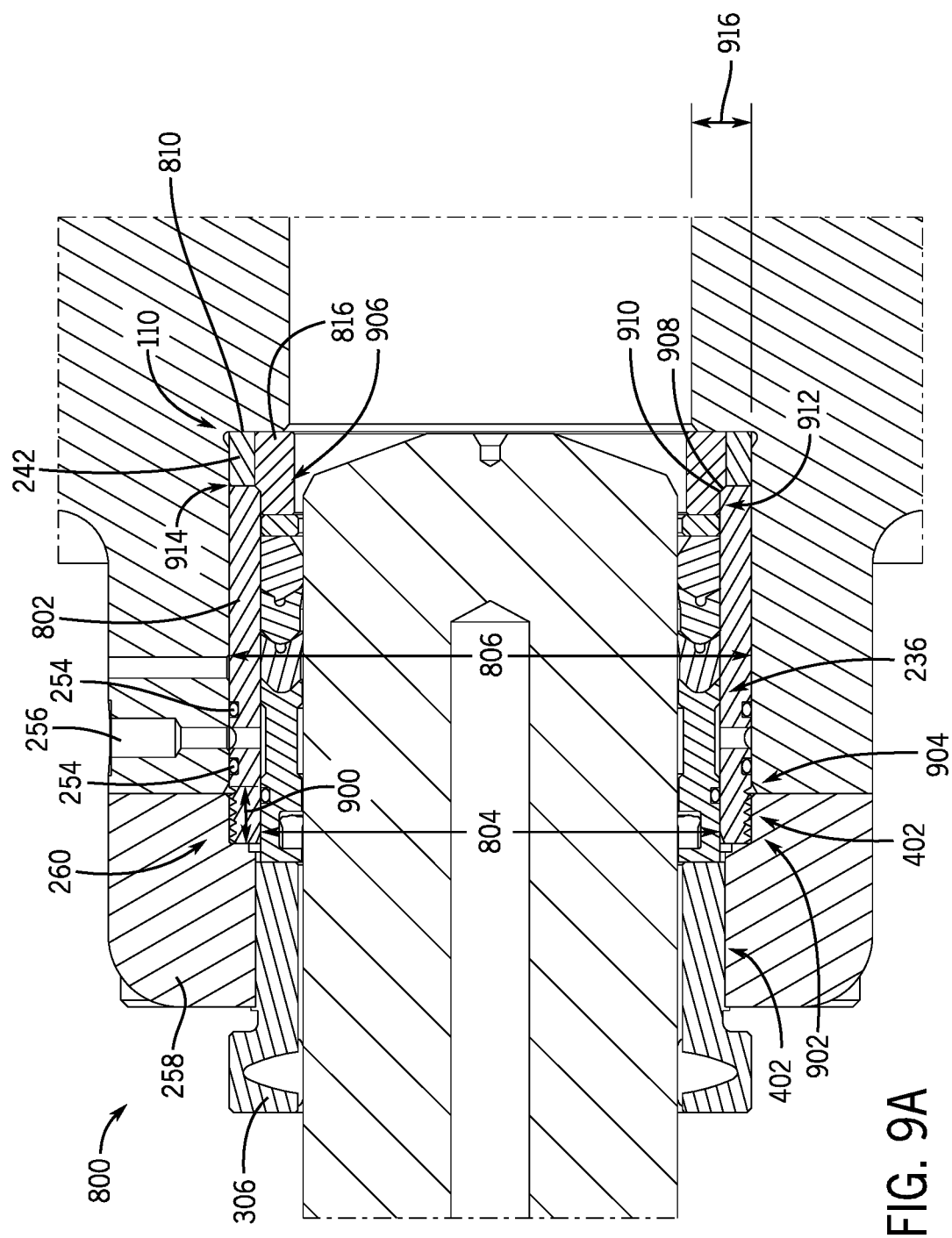
FIG. 9A is a detailed cross-sectional view of an embodiment of a pump assembly including a packing assembly, in accordance with embodiments of the present disclosure.
Figure 9B:
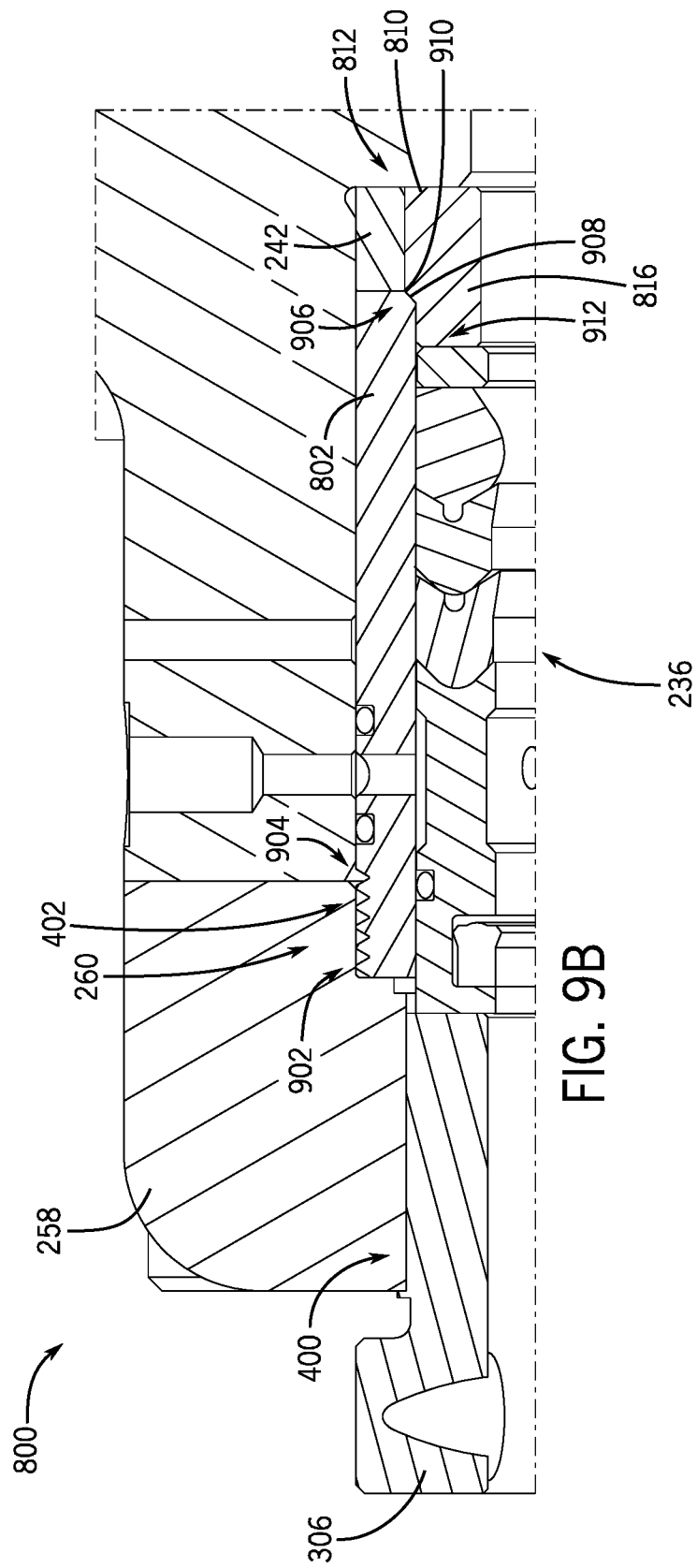
FIG. 9B is a detailed cross-sectional view of an embodiment of a pump assembly including a packing assembly, in accordance with embodiments of the present disclosure.

FIGS. 9A and 9B are detailed cross-sectional views of embodiments of the packing assembly 800. In one or more embodiments, the sleeve 802 is arranged within the bore 110 such to compress the seal 242 against the inner face 810 to block fluid flow from the bore 110. In at least one embodiment, the sleeve 802 includes substantially constant inner and outer diameters 804, 806. In one or more embodiments, the sleeve 802 does not include features to support the packing components 236, which may be supported by the ring 816 positioned radially inward of the seal 242.

FIGS. 9A and 9B further illustrate the grease port 256 and seal arrangement 254 described below. As shown, both are axially closer to the pressure chamber 112 (FIG. 1) than the coupling components 260, which are shown as threads in the illustrated embodiment. In this example, a coupling component length 900 is shown where a first portion 902 may be considered outside of the bore 110 and a second portion 904 may be considered inside of the bore 110. It should be appreciated that the portion or percentage of the length 900 which is inside or outside may be particularly selected based on expected operating conditions. Moreover, the component length 900 may be adjusted to accommodate various tools. In this example, it is shown that the coupling component 260 is aligned with the non-threaded portion 402 of the cap 258, whereas the threaded portion 400 is utilized to secure the packing nut 306.

In this example, the seal 242 is arranged axially closer to the pressure chamber 112 (FIG. 1) than the sleeve 802. Moreover, the ring 816 is also positioned axially closer than at least a portion of the sleeve 802. However, an overlapping portion 906 is illustrated between the ring 816 and the sleeve 802. At the overlapping portion 906, a sleeve edge 908 is shown to engage a ring edge 910, where both respective edges 908, 910 are arranged at angles. As a result, at least a portion of the sleeve edge 908 may have a different diameter than the remainder of the sleeve 802. A similar configuration is also illustrated at an opposite end of the sleeve 802 and may be utilized to simplify installation and removal, as well as provided a machined surface, among other benefits. It should be appreciated that this configuration is an example and additional angles or mating edges may be utilized, moreover, a curved or arcuate edge may be used to receive one or more of the sleeve 802 and/or the ring 816. In at least one embodiment, a ring shelf 912 receives and supports the packing components 236, where the ring shelf 912 is axially further away from the pressure chamber 112 (FIG. 1) than a sleeve end 914. In other words, the overlapping portion 906 is axially closer to the pressure chamber 112 (FIG. 1) than the packing components 236 in the illustrated embodiment. It should be appreciated that various other configurations may further be utilized within the scope of the present disclosure.

Various embodiments illustrate both the seal 242 and the ring 816 positioned on the shelf 812, which is formed at a location within the bore 110 having a changing diameter. It should be appreciated that the seal 242 may be considered a face seal and the shelf 812 may include a machined or sealing surface particularly selected to accommodate a sealing component. A shelf width 916 receives both the seal 242 and the ring 816 and, in certain embodiments, at least a portion of the ring 816 may overlap the shelf 812.

In operation, the packing assembly 800 is positioned within the bore 110 such that the sleeve 802 compresses the seal 242. In one or more embodiments, the seal 242 may be installed within the bore 110 prior to the sleeve 802. By way of example only, the seal 242 may be installed, followed by the ring 816, followed by the sleeve 802, and then the packing components 236. It should be appreciated that this installation procedure is by way of example only and not intended to limit the scope of the present disclosure.

Figure 10:
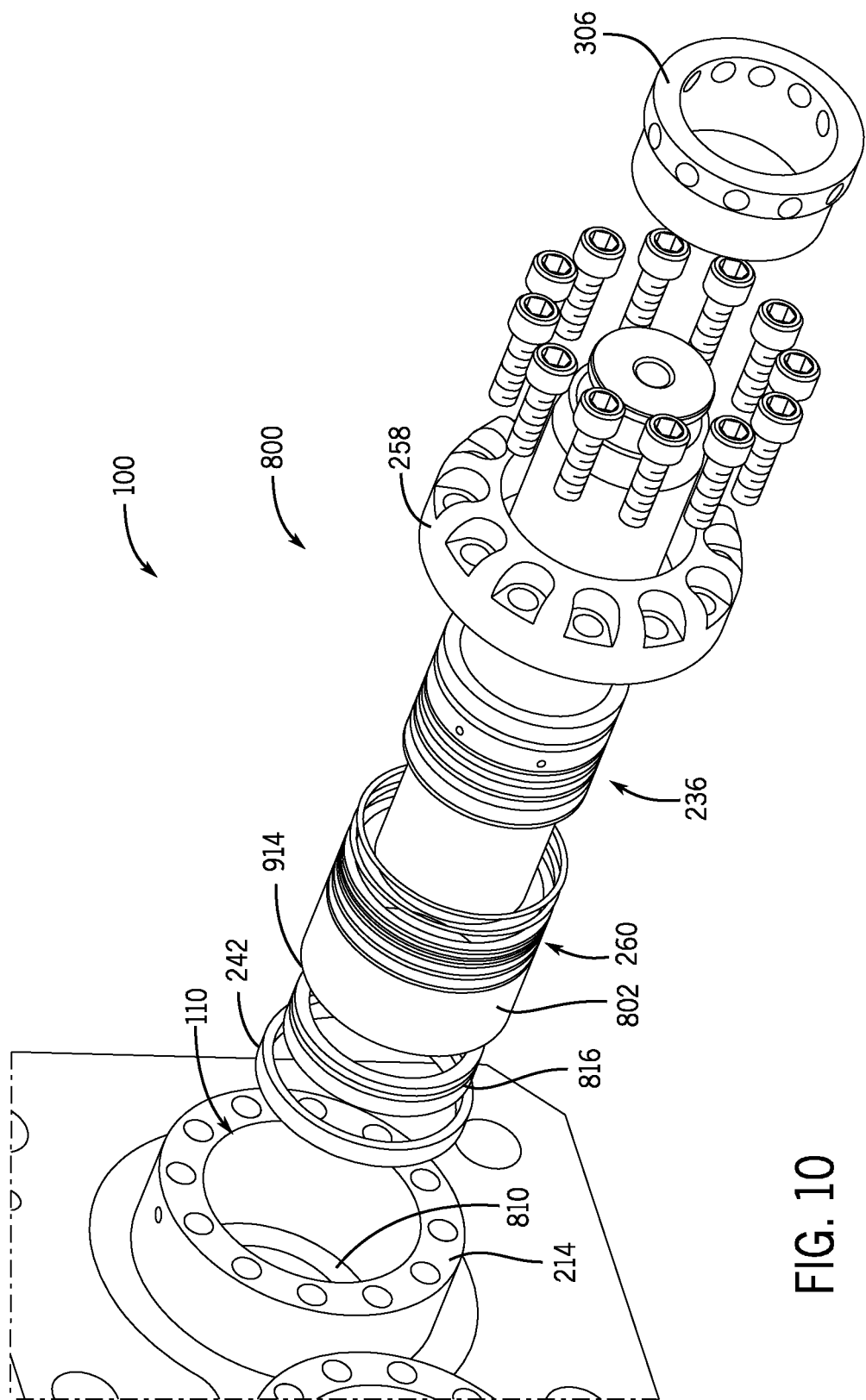
FIG. 10 is an exploded view of an embodiment of a pump assembly, in accordance with embodiments of the present disclosure.

FIG. 10 is an exploded cross-sectional view of the pump assembly 100 including the packing assembly 800. As shown, the illustrated packing assembly 800 is positioned proximate the face 214 and bore 110. The seal 242 is positioned out of the bore 110 and axially closer to the inner face 810 than the sleeve 802. Furthermore, the packing components 236 and plunger 106 are also installed within the bore 110, through the sleeve 802. The packing components 236 are secured in place via the packing nut 306.

In operation, the seal 242 may be arranged within bore 110 against the inner face 810 and then the sleeve 802 may be installed until the sleeve end 914 contacts the seal 242. In embodiments, coatings or the like may be used to prepare various surfaces. Additionally, in embodiments, the ring 816 is also positioned against the inner face 810. Thereafter, the packing components 236 may be installed, but it should be appreciated that the packing components 236 may also be installed prior to installation of the sleeve 802.

Further illustrated is the coupling component 260, which may include threads to facilitate coupling to an installation tool for assembly and/or removal. In this example, the coupling component 260 is positioned at an end of the sleeve 802 extending axially away from the bore 110. In operation, the coupling component 260 may align with the cap 258, for example with a non-threaded portion (not pictured). In one or more embodiments, the cap 258 may be used to protect or otherwise guard the coupling component 260. In should be appreciated that, in one or more embodiments, the coupling component 260 may also be configured to couple to the cap 258. Moreover, while not illustrated in FIG. 10, installation and/or removal may be accomplished using one or more tools, as described herein.

Figure 11:
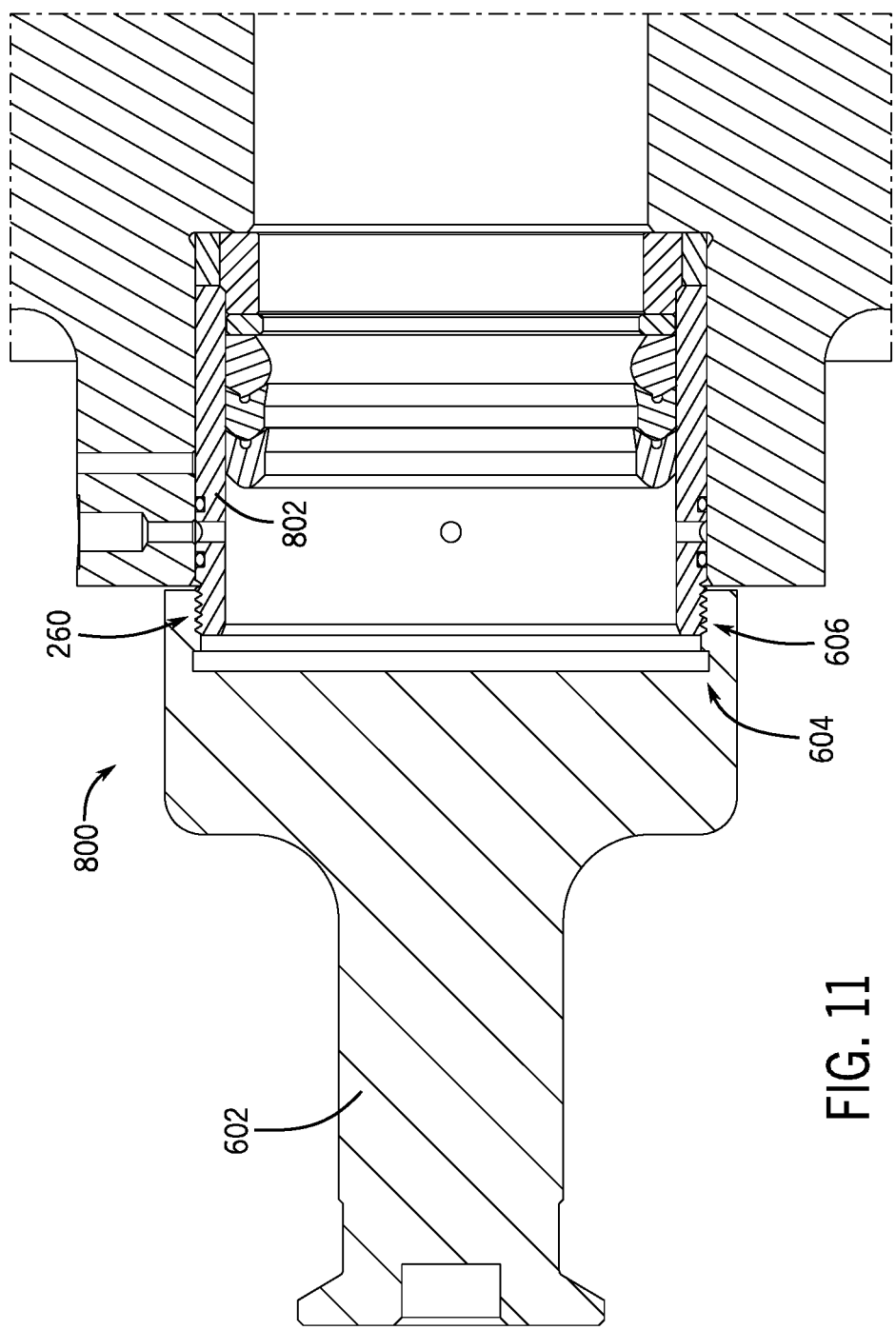
FIG. 11 is a cross-sectional view of an embodiment of a sleeve coupled to a tool, in accordance with embodiments of the present disclosure.

FIG. 11 is a cross-sectional view of an embodiment of the packing assembly 800 coupled to the installation/removal tool 602. In this example, the mating coupling components 606 of the engaging end 604 are coupled to the coupling components 260 of the sleeve 802 to facilitate installation and removal. As noted above, in various embodiments, the tool 602 may be coupled to one or more components of the assembly to facilitate removal, for example by driving rotation of the tool 602 and/or by driving axial movement of the tool 602.

Figure 12:
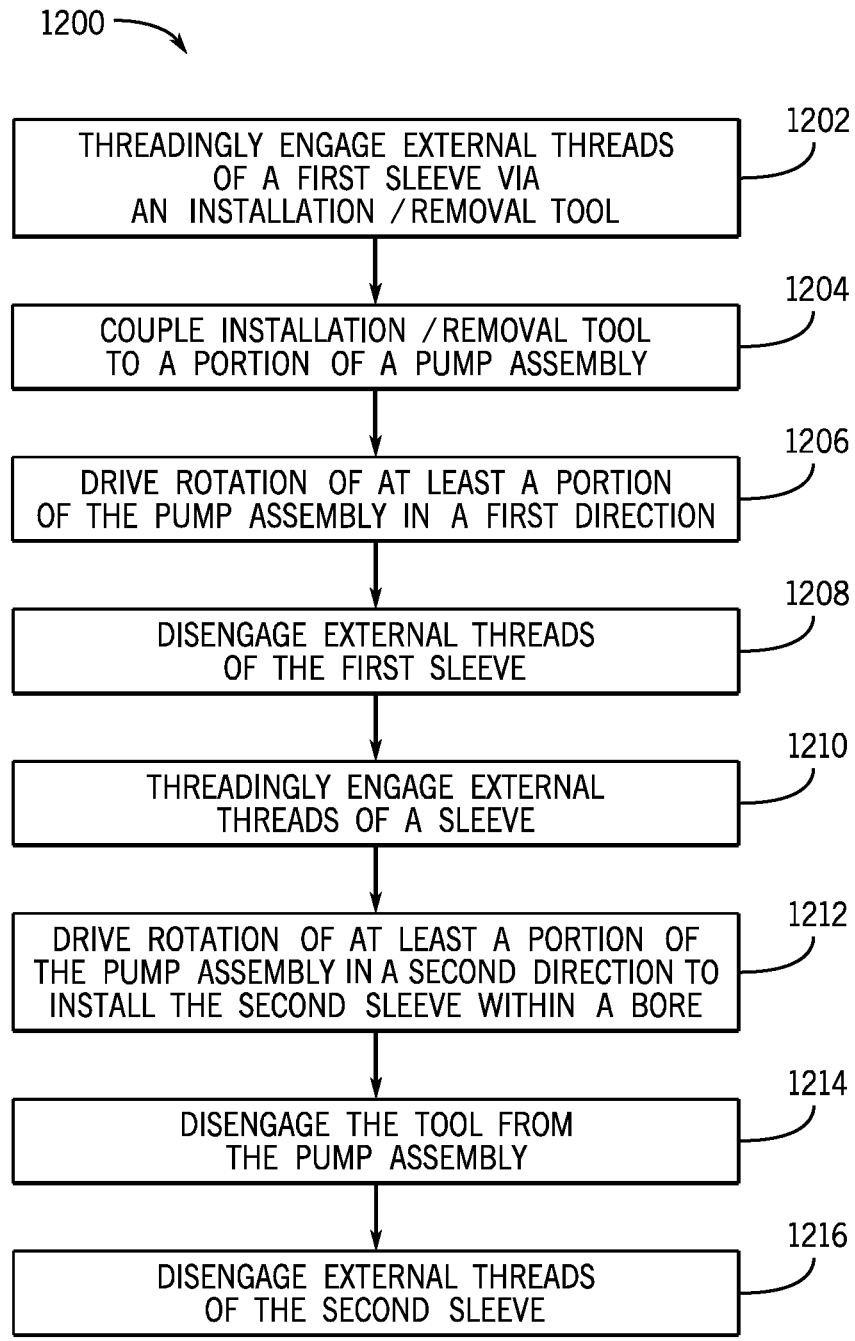
FIG. 12 is a flow chart of an embodiment of a method for sleeve installation and removal, in accordance with embodiments of the present disclosure.

FIG. 12 is a flow chart of an embodiment of a method 1200 for installation and removal of a sleeve. It should be appreciated for this method, and all methods described herein, that there may be more or fewer steps. Additionally, the steps may be performed in a different order, or in parallel, unless otherwise specifically stated. In this example, external threads of a first sleeve are engaged via an installation and removal tool 1202. For example, external threads may corresponds to a coupling component on a sleeve where the coupling component is not engaged during operation of the pump but engaged during installation and/or removal. Furthermore, it should be appreciated that while threads are discussed with respect to the method, various other coupling mechanisms may be used in other embodiments of the present disclosure. The tool may be coupled to a portion of a pump assembly 1204. In at least one embodiment, the tool is coupled to pump pony rods via a clamp connection, but other locations may also be used. Rotation of a portion of the pump, such as the crankshaft, may be driven in a first direction 1206. In at least one embodiment, rotation axially moves the tool, and thereafter the coupled sleeve, axially away and out of a bore. The first sleeve is disengaged from the tool 1208 and external threads of a second sleeve are engaged 1210. Rotation of the portion of the pump may then be applied in a second, opposite, direction to axially move the second sleeve toward the bore 1212. The tool may then be disengaged from the pump assembly 1214 and the tool may also be disengaged from the second sleeve 1216. In this manner, one or more sleeves may be removed or installed within bores of a pump assembly.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A packing assembly to be positioned in a bore of a fluid end block, the packing assembly comprising:
   a packing sleeve having a first end and a second end, the first end having a coupling component positioned to engage a tool, the coupling component comprising threads on an outer diameter of the packing sleeve;
   a ring having a ring edge engaged with the second end of the packing sleeve, a portion of the ring edge axially overlapping an inner diameter of the packing sleeve at the second end of the packing sleeve;
   a seal engaged with an outer diameter of the ring, the seal contacting the second end of the packing sleeve;
   a plurality of packing components positioned at least partially in the packing sleeve and radially inward of the packing sleeve, and an inner diameter of the packing sleeve positioned radially adjacent the plurality of packing components; and
   a cap positioned to contact the first end of the packing sleeve when assembled relative to the packing sleeve and the threads not engaging the cap.

2. The packing assembly of claim 1, wherein a first portion of the coupling component is configured to be positioned outside of the bore, and wherein a second portion of the coupling component is configured to be positioned inside of the bore.

3. The packing assembly of claim 1, further comprising a sleeve edge in contact with the ring edge at an overlapping portion of the sleeve edge.

4. The packing assembly of claim 1, wherein at least a portion of the packing sleeve extends radially inward farther than at least a portion of the ring.

5. A packing assembly positioned within a fluid end bore, the packing assembly comprising:
   a seal positioned against an inner face of the fluid end bore;

a sleeve having:
a first end positioned against the seal, both the sleeve and the seal positioned in contact with an inner diameter of the fluid end bore,
a second end, and
a radially outwardly facing coupling component at the second end, the coupling component comprising threads on an outer diameter of the sleeve;
a ring positioned radially inward relative to the seal and contacting the first end of the sleeve,
a cap positioned to contact the first end of the packing sleeve when assembled relative to the packing sleeve and the threads not engaging the cap; and
a plurality of packing components positioned along an axis of the sleeve and radially adjacent the sleeve, the ring axially positioned between the plurality of packing components and the inner face of the fluid end bore.

6. The packing assembly of claim 5, wherein a first portion of the coupling component extends axially out of the fluid end bore, and wherein a second portion of the coupling component is positioned axially within the fluid end bore.

7. The packing assembly of claim 5, wherein the coupling component is configured to engage an installation/removal tool that, responsive to rotation of a crankshaft, axially moves the sleeve with respect to the fluid end bore.

8. The packing assembly of claim 5, wherein at least a portion of the ring axially overlaps at least a portion of the sleeve.

9. The packing assembly of claim 5, wherein the ring further comprises a ring shelf in contact with one of the plurality of packing components, the ring shelf positioned axially closer to the coupling component than the seal.

10. The packing assembly of claim 5, wherein the coupling component is not directly engaged with the fluid end bore.

11. The packing assembly of claim 5, wherein an inner diameter of the sleeve is parallel to an outer diameter of the sleeve.

12. The packing assembly of claim 11, wherein the inner diameter of the sleeve and the outer diameter of the sleeve are constant along a majority of a length of the sleeve.

* * * * *